US00RE42267E

(19) United States
(12) Reissued Patent
Michler et al.

(10) Patent Number: US RE42,267 E
(45) Date of Reissued Patent: Apr. 5, 2011

(54) STARWHEEL FEED APPARATUS AND METHOD

(75) Inventors: James R. Michler, Ashland, WI (US); Martin Eder, III, Ashland, WI (US); Thomas W. Schneider, Grand View, WI (US)

(73) Assignee: C.G. Bretting Manufacturing Company, Inc., Ashland, WI (US)

( * ) Notice: This patent is subject to a terminal disclaimer.

(21) Appl. No.: 11/824,463

(22) Filed: Jun. 29, 2007

Related U.S. Patent Documents

Reissue of:
(64) Patent No.: 7,219,887
Issued: May 22, 2007
Appl. No.: 11/104,399
Filed: Apr. 12, 2005

U.S. Applications:
(63) Continuation of application No. 10/630,352, filed on Jul. 30, 2003, now Pat. No. 6,877,740.

(51) Int. Cl.
*B65H 29/00* (2006.01)

(52) U.S. Cl. ..... 271/187; 271/315

(58) Field of Classification Search ..... 271/182, 271/187, 315, 70
See application file for complete search history.

(56) References Cited

U.S. PATENT DOCUMENTS

| | | | |
|---|---|---|---|
| 950,014 | A | 2/1910 | Boyce |
| 980,385 | A | 1/1911 | Wollheim |
| 1,586,544 | A | 6/1926 | White |
| 1,701,760 | A | 2/1929 | Paffen |
| 1,845,895 | A | 2/1932 | Van Voorhis |
| 1,985,676 | A | 12/1934 | Hand |
| 1,991,411 | A | 2/1935 | Novick |
| 1,992,179 | A | 2/1935 | Blosser et al. |
| 2,011,236 | A | 8/1935 | Winter et al. |
| 2,016,309 | A | 10/1935 | Zuckerman |
| 2,109,050 | A | 2/1938 | Quick et al. |
| 2,631,845 | A | 3/1953 | Zuckerman |
| 2,775,171 | A | 12/1956 | Steen et al. |
| 2,787,468 | A | 4/1957 | Novick |

(Continued)

FOREIGN PATENT DOCUMENTS

| | | |
|---|---|---|
| AT | 219396 | 1/1962 |

(Continued)

OTHER PUBLICATIONS

Exhibit A—9-page disclosure relating to a transfer system manufactured by the assignee.

(Continued)

*Primary Examiner* — David H Bollinger
(74) *Attorney, Agent, or Firm* — Michael Best & Friedrich LLP

(57) ABSTRACT

A starwheel feed apparatus and method for feeding and guiding sheets of a web material into a starwheel assembly. In some embodiments, a feeding conveyor is movable to convey sheets at a first velocity toward the starwheel, and a guiding conveyor is located adjacent the starwheel and has a conveying surface movable at a velocity less than the first velocity. In other embodiments, other relative speeds of the guiding and feeding conveyors are employed. In some embodiments, a feeding conveyor feeds sheets into slots of a starwheel, and a guiding conveyor located adjacent the starwheel has a conveying surface to guide trailing edges of the sheets along a length of the conveying surface as the sheets enter the slots.

70 Claims, 8 Drawing Sheets

U.S. PATENT DOCUMENTS

| | | | |
|---|---|---|---|
| 2,981,411 | A | 4/1958 | Azari |
| 2,929,624 | A | 3/1960 | Brooker |
| 2,954,881 | A | 10/1960 | Hopton et al. |
| 3,019,886 | A | 2/1962 | Winkler et al. |
| 3,044,228 | A | 7/1962 | Peterson |
| 3,088,604 | A | 5/1963 | Nilsson |
| 3,163,413 | A | 12/1964 | Franke et al. |
| 3,207,361 | A | 9/1965 | Marcalus |
| 3,213,734 | A | 10/1965 | Nystrand |
| 3,254,889 | A | 6/1966 | Nystrand |
| 3,256,012 | A | 6/1966 | Bradley |
| 3,279,664 | A | 10/1966 | Lynch |
| 3,279,792 | A | 10/1966 | Kostal et al. |
| 3,292,470 | A | 12/1966 | Nystrand et al. |
| 3,298,683 | A | 1/1967 | Stroud |
| 3,313,538 | A | 4/1967 | Isii |
| 3,331,183 | A | 7/1967 | Gass |
| 3,347,367 | A | 10/1967 | Smith |
| 3,351,215 | A | 11/1967 | Kitch |
| 3,414,138 | A | 12/1968 | Junemann et al. |
| 3,418,895 | A | 12/1968 | Palmer |
| 3,479,932 | A | 11/1969 | Stal et al. |
| 3,531,108 | A | 9/1970 | Rabinow et al. |
| 3,552,828 | A | 1/1971 | Lawrence et al. |
| 3,557,688 | A | 1/1971 | Hartbauer et al. |
| 3,624,723 | A | 11/1971 | Cannon |
| 3,643,555 | A | 2/1972 | Ehlscheid |
| 3,643,816 | A | 2/1972 | Jacobsen |
| 3,656,271 | A | 4/1972 | O'Shea et al. |
| 3,675,792 | A | 7/1972 | Griner et al. |
| 3,689,061 | A | 9/1972 | Nystrand |
| 3,724,640 | A | 4/1973 | Rapparlie |
| 3,729,886 | A | 5/1973 | Lucas et al. |
| 3,739,886 | A | 6/1973 | Kertzman |
| 3,740,049 | A | 6/1973 | Fischer |
| 3,752,043 | A | 8/1973 | Rapparlie et al. |
| 3,758,381 | A | 9/1973 | Knoke |
| RE27,765 | E | 10/1973 | Salomon |
| 3,766,701 | A | 10/1973 | Besserdich et al. |
| 3,773,322 | A | 11/1973 | Schlagbauer et al. |
| 3,784,187 | A | 1/1974 | Takayanagi et al. |
| 3,784,188 | A | 1/1974 | DeLigt |
| 3,788,636 | A | 1/1974 | Rehm et al. |
| 3,834,689 | A | 9/1974 | Lee et al. |
| 3,866,905 | A | 2/1975 | Trogan et al. |
| 3,870,292 | A | 3/1975 | Bradley |
| 3,902,587 | A | 9/1975 | Cheoccucci |
| 3,905,260 | A | 9/1975 | Nystrand |
| 3,948,504 | A | 4/1976 | Woessner et al. |
| 3,977,152 | A | 8/1976 | Rochla et al. |
| 3,980,183 | A | 9/1976 | Anikanov et al. |
| 3,995,748 | A | 12/1976 | Looney |
| 4,029,310 | A | 6/1977 | Reist |
| 4,070,014 | A | 1/1978 | Takahashi |
| 4,102,253 | A | 7/1978 | Gannicott |
| 4,125,253 | A | 11/1978 | Wangermann |
| 4,162,733 | A | 7/1979 | Wiseman |
| 4,173,846 | A | 11/1979 | Steiner et al. |
| 4,181,052 | A | 1/1980 | Kopp |
| 4,181,213 | A | 1/1980 | Deutschlander et al. |
| 4,183,704 | A | 1/1980 | Steinhart |
| 4,190,241 | A | 2/1980 | Krueger |
| 4,190,242 | A | 2/1980 | Bolza-Schunemann |
| 4,228,997 | A | 10/1980 | Schoonmaker et al. |
| 4,229,134 | A | 10/1980 | Reist |
| 4,244,565 | A | 1/1981 | Geier |
| 4,269,555 | A | 5/1981 | Franks |
| 4,279,410 | A | 7/1981 | Bolza-Schunemann |
| 4,285,621 | A | 8/1981 | Spencer |
| 4,311,475 | A | 1/1982 | Imai |
| 4,314,785 | A | 2/1982 | LaFleur, Jr. et al. |
| 4,332,582 | A | 6/1982 | Hertrich |
| 4,349,185 | A | 9/1982 | Small et al. |
| 4,349,188 | A | 9/1982 | Young |
| 4,357,126 | A | 11/1982 | Kidd et al. |
| 4,391,596 | A | 7/1983 | Fischer |
| 4,396,336 | A | 8/1983 | Malamood |
| 4,406,650 | A | 9/1983 | Felix |
| 4,441,703 | A | 4/1984 | Faltin |
| 4,460,169 | A | 7/1984 | Bartesaghi |
| 4,470,590 | A | 9/1984 | Ariga et al. |
| 4,474,521 | A | 10/1984 | Jaton |
| 4,475,730 | A | 10/1984 | Trogan |
| 4,494,741 | A | 1/1985 | Fischer et al. |
| 4,501,418 | A | 2/1985 | Ariga et al. |
| 4,506,882 | A | 3/1985 | Ito et al. |
| 4,508,527 | A | 4/1985 | Uno et al. |
| 4,511,136 | A | 4/1985 | Yamada et al. |
| 4,521,008 | A | 6/1985 | Granzow et al. |
| 4,522,387 | A | 6/1985 | Leuthold |
| 4,530,694 | A | 7/1985 | Kobler et al. |
| 4,534,552 | A | 8/1985 | Rahe |
| 4,537,390 | A | 8/1985 | Kiamco et al. |
| 4,552,351 | A | 11/1985 | Tsukamoto |
| 4,565,363 | A | 1/1986 | Faltin |
| 4,577,852 | A | 3/1986 | Grunder |
| 4,584,917 | A | 4/1986 | Blom |
| 4,593,896 | A | 6/1986 | Nakamura |
| 4,595,193 | A | 6/1986 | Nakamura |
| 4,600,186 | A | 7/1986 | von Hein et al. |
| 4,603,849 | A | 8/1986 | Nakamura et al. |
| 4,613,268 | A | 9/1986 | Capdeboscq et al. |
| 4,625,957 | A | 12/1986 | DuFresne |
| 4,629,174 | A | 12/1986 | Wakisaka et al. |
| 4,650,447 | A | 3/1987 | Meschi |
| 4,669,644 | A | 6/1987 | Nilsson |
| 4,673,382 | A | 6/1987 | Buck et al. |
| 4,700,939 | A | 10/1987 | Hathaway |
| 4,714,394 | A | 12/1987 | Ehlscheid et al. |
| 4,717,135 | A | 1/1988 | Hathaway |
| 4,721,295 | A | 1/1988 | Hathaway |
| 4,736,936 | A | 4/1988 | Hertel et al. |
| 4,751,807 | A | 6/1988 | Couturier |
| 4,762,313 | A | 8/1988 | Nilsson |
| 4,770,402 | A | 9/1988 | Couturier |
| RE32,872 | E | 2/1989 | Buck |
| 4,821,613 | A | 4/1989 | Hertel |
| 4,824,307 | A | 4/1989 | Johnson et al. |
| 4,824,426 | A | 4/1989 | DuFresne |
| 4,842,573 | A | 6/1989 | Peter et al. |
| 4,846,454 | A | 7/1989 | Parkander |
| 4,874,158 | A | 10/1989 | Retzloff |
| 4,915,371 | A | 4/1990 | Quinton |
| 4,921,235 | A | 5/1990 | Biagiotti et al. |
| 4,925,173 | A | 5/1990 | Lindblom et al. |
| 4,925,179 | A | 5/1990 | Breton et al. |
| 4,930,977 | A | 6/1990 | Beeman et al. |
| 4,938,465 | A | 7/1990 | Marsiletti |
| 4,948,112 | A | 8/1990 | Sato et al. |
| 4,977,803 | A | 12/1990 | Blom |
| 4,979,727 | A | 12/1990 | Koike et al. |
| 4,997,338 | A | 3/1991 | Couturier et al. |
| 5,000,437 | A | 3/1991 | Schneider et al. |
| 5,038,647 | A | 8/1991 | Biagiotti |
| 5,040,663 | A | 8/1991 | Gould et al. |
| 5,040,783 | A | 8/1991 | Ruehl |
| 5,049,123 | A | 9/1991 | Breton |
| 5,074,735 | A | 12/1991 | Stock |
| 5,076,559 | A | 12/1991 | Lawniczak |
| 5,083,998 | A | 1/1992 | Carter |
| 5,088,707 | A | 2/1992 | Stemmler |
| 5,088,720 | A | 2/1992 | Beeman et al. |
| 5,101,963 | A | 4/1992 | Skarlupka et al. |
| 5,114,306 | A | 5/1992 | Sjogren et al. |
| 5,120,049 | A | 6/1992 | Fischer |
| 5,125,645 | A | 6/1992 | Eberle |
| 5,152,203 | A | 10/1992 | Wierschke |
| 5,188,212 | A | 2/1993 | Munsch |
| 5,201,700 | A | 4/1993 | Meschi |
| 5,217,220 | A | 6/1993 | Carlson et al. |
| 5,236,188 | A | 8/1993 | Breton et al. |
| 5,242,367 | A | 9/1993 | Marmin |
| 5,249,791 | A | 10/1993 | Belanger et al. |
| 5,261,655 | A | 11/1993 | Keller et al. |
| 5,289,747 | A | 3/1994 | Wunderlich |
| 5,290,141 | A | 3/1994 | Grinager |
| 5,299,793 | A | 4/1994 | Couturier |

| | | | |
|---|---|---|---|
| 5,315,907 | A | 5/1994 | Biagiotti |
| 5,322,270 | A | 6/1994 | Belanger et al. |
| 5,324,014 | A | 6/1994 | Honegger et al. |
| 5,356,131 | A | 10/1994 | Mauro |
| 5,359,929 | A | 11/1994 | Hansen |
| 5,359,930 | A | 11/1994 | Hansen |
| 5,405,126 | A | 4/1995 | Mack |
| 5,425,697 | A | 6/1995 | Lanvin |
| 5,454,687 | A | 10/1995 | Johnson et al. |
| 5,458,033 | A | 10/1995 | Wierschke |
| 5,460,258 | A | 10/1995 | Tisma |
| 5,464,316 | A | 11/1995 | Kranz |
| 5,485,992 | A | 1/1996 | Albert et al. |
| 5,503,518 | A | 4/1996 | Scholz |
| 5,518,230 | A | 5/1996 | Scarlata et al. |
| 5,522,292 | A | 6/1996 | Biagiotti |
| 5,524,876 | A | 6/1996 | Porter |
| 5,551,678 | A | 9/1996 | Michalik et al. |
| 5,558,488 | A | 9/1996 | Gentry |
| 5,579,894 | A | 12/1996 | Glazier et al. |
| 5,597,285 | A | 1/1997 | Meyer et al. |
| 5,611,530 | A | 3/1997 | Maresse et al. |
| 5,620,081 | A | 4/1997 | Kivits |
| 5,630,584 | A | 5/1997 | Seeber |
| 5,639,083 | A | 6/1997 | Doucet |
| 5,647,586 | A | 7/1997 | Novick et al. |
| 5,690,328 | A | 11/1997 | Herda et al. |
| 5,692,740 | A | 12/1997 | Holtje |
| 5,730,435 | A | 3/1998 | Belanger et al. |
| 5,730,695 | A | 3/1998 | Hauschild et al. |
| 5,732,623 | A | 3/1998 | Compera et al. |
| 5,772,391 | A | 6/1998 | Sjogren et al. |
| 5,775,682 | A | 7/1998 | Hosking et al. |
| 5,803,705 | A | 9/1998 | Keyes |
| 5,820,122 | A | 10/1998 | Schneider |
| 5,894,937 | A | 4/1999 | Schmidt |
| 5,899,447 | A | 5/1999 | Muckenfuhs |
| 5,899,448 | A | 5/1999 | Hosking |
| 5,927,712 | A | 7/1999 | Curley et al. |
| 5,947,470 | A | 9/1999 | Fernandez |
| 5,975,273 | A | 11/1999 | Zwahlen et al. |
| 5,975,525 | A | 11/1999 | Hartmann et al. |
| 6,000,334 | A | 12/1999 | Suzuki |
| 6,102,189 | A | 8/2000 | Romagnoli |
| 6,165,116 | A | 12/2000 | White |
| 6,254,522 | B1 | 7/2001 | Schmidt |
| 6,322,315 | B1 | 11/2001 | Schmidt et al. |
| 6,354,591 | B1 | 3/2002 | d'Agrella |
| 6,394,445 | B1 | 5/2002 | d'Agrella et al. |
| 6,439,372 | B1 | 8/2002 | Wittmaier |
| 6,877,740 | B2 | 4/2005 | Michler et al. |
| 2002/0020963 | A1 | 2/2002 | Steinkogler et al. |

FOREIGN PATENT DOCUMENTS

| | | |
|---|---|---|
| DE | 372031 | 3/1923 |
| DE | 442935 | 4/1927 |
| DE | 719833 | 4/1942 |
| FR | 755348 | 11/1933 |
| FR | 1215073 | 4/1960 |
| GB | 321873 | 11/1929 |
| GB | 513171 | 10/1939 |
| GB | 1479299 | 7/1977 |
| IT | 646301 | 2/1966 |
| SE | 116974 | 8/1946 |

OTHER PUBLICATIONS

Exhibit B—13-page disclosure relating to transfer system manufactured by the assignee.

STARWHEEL FEED APPARATUS AND METHOD

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. patent application Ser. No. 11/104,399, filed Apr. 12, 2005, now U.S. Pat. No. 7,219,887, which is a continuation of U.S. patent application Ser. No. 10/630,352, filed Jul. 30, 2003, now U.S. Pat. No. 6,877,740.*

BACKGROUND OF THE INVENTION

Many stacking devices are used to continuously create stacks of sheet products. In some common stacking devices, the sheets are fed from a feeding system to a first position of a starwheel that is rotated about a starwheel axis. The starwheel includes a plurality of blades or fins between which sheets are received to be rotated with the starwheel. Each sheet is fed into a slot having a width and formed between two adjacent fins, and each sheet is rotated within the starwheel to a second position where the sheet is stopped and thereby removed from the starwheel, such as by a barrier. The removed sheets can then be stacked upon a stacking platform or other structure to be carried away by a downstream conveyor of any type.

Existing feeding systems do not adequately feed sheets of web material into starwheels (particularly at high speeds) leading to sheet wrinkling or damage, increased scrap material and machine downtime and in some cases, poor stack quality. Existing feeding systems attempt to decelerate sheets as the sheets are fed into a starwheel by adjusting the width of the starwheel slots, thereby requiring the design and use of a different starwheel for each type of sheet. In light of the limitations of existing starwheel feeding systems, an improved starwheel feed apparatus would be welcome in the art.

SUMMARY OF THE INVENTION

The present invention relates to a starwheel feed apparatus and method for feeding and guiding sheets into a starwheel assembly. A feeding conveyor can be located upstream of the starwheel for conveying sheets toward the starwheel, and a guiding conveyor having a conveying surface can be located adjacent the starwheel for guiding the sheets into slots of the starwheel. In some embodiments, the feeding conveyor is located upstream of the starwheel and is movable to convey sheets at a first velocity toward the starwheel, and the guiding conveyor is located adjacent the starwheel and has a conveying surface movable at a velocity less than or equal to the first velocity to guide the sheets into slots of the starwheel. In some embodiments, the conveying surface velocity can be adjusted to feed different sheets into the same starwheel assembly. Also, in some embodiments, the feeding conveyor is movable to feed sheets into slots of a starwheel, and the guiding conveyor is located adjacent the starwheel and has a conveying surface to guide trailing edges of the sheets along a length of the conveying surface as the sheets enter the slots.

Further aspects of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show exemplary embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE EMBODIMENTS

Figure 1:
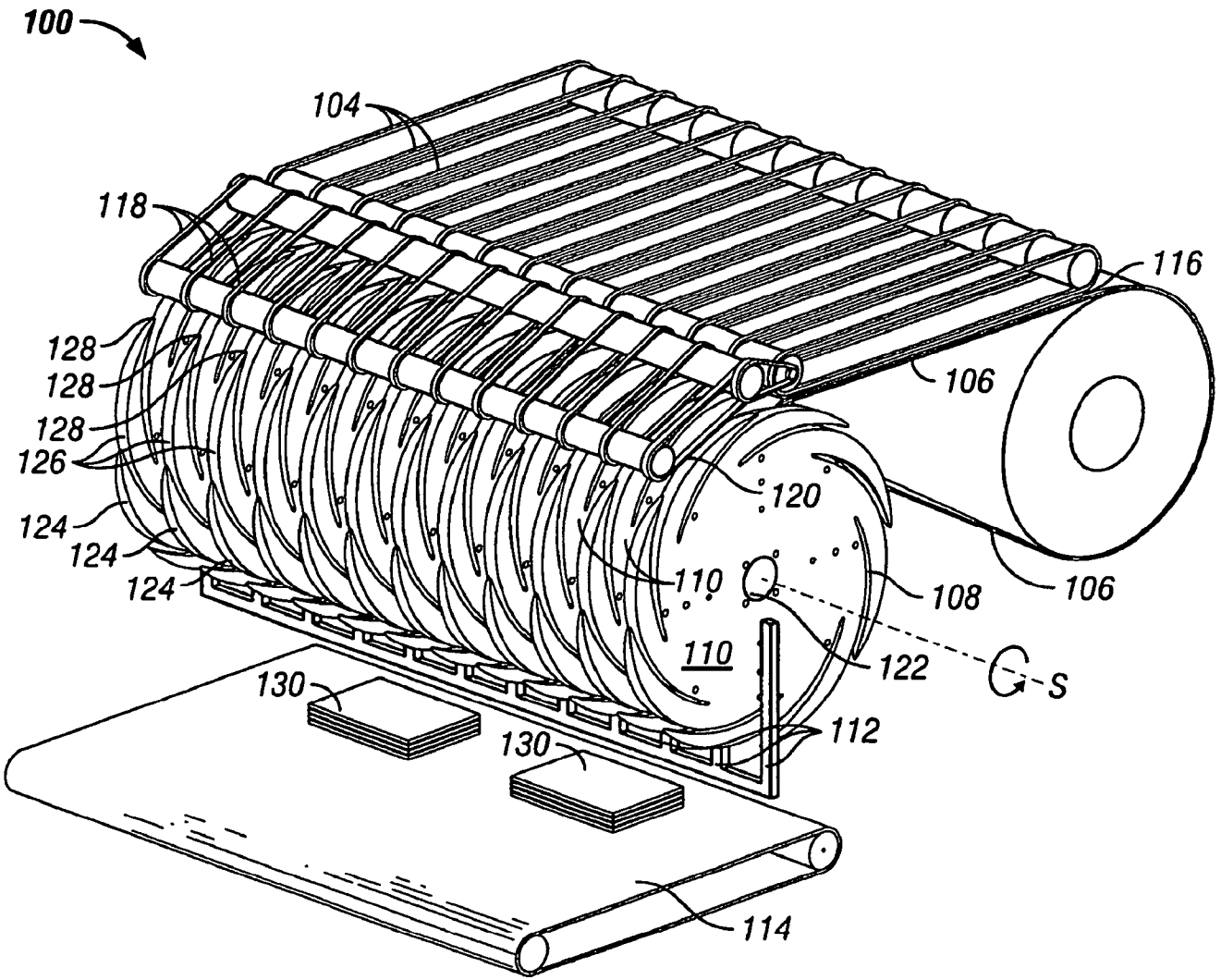
FIG. 1 is a perspective view of a starwheel feed apparatus according to an exemplary embodiment of the present invention.

Referring to the figures, and more particularly to FIG. 1, a starwheel feed apparatus constructed in accordance with an exemplary embodiment of the present invention is shown generally at 100. The starwheel feed apparatus 100 comprises several components and devices performing various functions. The starwheel feed apparatus 100 includes feeding conveyor(s) 104, 106 that feed a sheet 102 of web material toward a starwheel 110, and a guiding apparatus. The guiding apparatus can take the form of or include guiding conveyor(s) 118 that guide and/or decelerate the sheet 102 as it enters the starwheel 110. As will be described in greater detail below, in some embodiments of the present invention, a sheet 102 of web material is advanced along and between one or more sets of first and second feeding conveyors 104, 106; decelerated and/or guided by a guiding conveyor 118 into a slot 108 located in a starwheel 110; moved along with the slot 108 as the starwheel 110 is rotated about an axis; abutted against a barrier 112; ejected from the slot 108; and stacked upon a platform 114 or in another location. Any number, combination, and series of conveyors 104, 106 and 118, slots 108, starwheels 110, barriers 112, and platforms 114 can be used without departing from the present invention.

The starwheel feed apparatus 100 according to the present invention can be employed to feed material into one or more starwheels or starwheel assemblies 110 following any type of upstream process or processes, including without limitation folding, embossing, cutting, and other processes. In this regard, any upstream equipment or elements (not shown) for manufacturing, treating, modifying or preparing sheet material before it reaches the starwheel feed apparatus 100 can be employed in conjunction with the present invention. As used herein and in the appended claims, the term "upstream" is used to describe any location, element or process that occurs prior to the point or area being referred to, whereas the term "downstream" is used to describe any location, element or process that occurs subsequent to the point or area of reference.

In some embodiments of the present invention, such as those illustrated in FIGS. 1-15, the starwheel 110 includes a shaft 122 and a plurality of starwheels 110. The shaft 122 is rotatably coupled to a frame (not shown) about an axis S and is rotated by a motor (not shown) either directly or indirectly (e.g., via one or more gears, belts, chains, and the like driven by the motor, feeding and/or guiding conveyor(s) 104, 106, 118, or other associated equipment). The shaft 122 can be driven independently from the starwheel feed apparatus 100.

With continued reference to the exemplary embodiments illustrated in FIGS. 1-15, each starwheel 110 is coupled to the shaft 122 such that the rotational axis S of the shaft 122 is located at the center of each starwheel 110. Each starwheel 110 can be disk shaped and can be generally defined by a diameter and a thickness. In other embodiments, one or more starwheels 110 can comprise rods or other elongated elements of a generally star-shaped structure. Still other starwheel shapes are possible, each having a number of slots, grooves, recesses, or other types of apertures capable of receiving sheets 102 therein for transport as the starwheels 110 rotate. Good performance has been demonstrated by embodiments in which each starwheel 110 is the same size and thickness.

In some embodiments of the present invention, each starwheel 110 includes a plurality of fins 124 (best illustrated in FIG. 1) that project from the center of each starwheel 110. With continued reference to the illustrated exemplary embodiment, each fin 124 includes a base 126 and a tip 128. The tip 128 is positioned at a farther radial distance from the center of the starwheel 110 than the base 126. The fins 124 can be the same thickness as the body of the starwheel 110, or can have a varying or other different thickness along their lengths. In addition, in some embodiments, the fins 124 curve in a uniform direction opposite to the direction of rotation, and overlap with adjacent fins 124 such that a slot 108 is formed between adjacent fins 124 (see FIGS. 1-15). Each slot 108 thus curves in the same direction as the direction of the fins 124, and can be narrowest adjacent to the base 126 of the adjacent fins 124 and widest at the tips 128 of the adjacent fins 124. The slots 108 receive sheets 102 from the feeding conveyors 104, 106 and support the sheets 102 within the starwheel 110 until a force causes the sheets 102 to be removed from the slots 108.

The size, shape, and number of fins 124 (and thus slots 108) included on each starwheel 110 can be varied. For example, each starwheel 110 can include as few as two fins 124 and as many as structurally possible. In some embodiments, the starwheels 110 have between 4 and 30 fins. In other embodiments, the starwheels have between 8 and 24 fins. Good performance has been achieved by embodiments employing starwheels having 8, 10, 12 or 16 fins. The fins 124 need not curve in the direction opposite that of motion, but instead can have any shape necessary, including without limitation projecting straight from the body of the starwheel 110, being partially straight and partially curved, and having any other shape necessary for receiving and transporting sheets 102 in starwheel slots 108. The fins 124 can have any width necessary for supporting the sheets 102, including without limitation having a uniform width, becoming wider instead of tapering as they extend away from the center of the starwheel 110, and having any other width or fin shape necessary to hold and transport the sheets 102. The fins 124 can also be thicker or thinner than the thickness of the starwheel 110. The configuration of the slots 108 is also variable to the extent the slots 108 are dependent upon the shape and number of the fins 124.

The starwheel assembly 110 with which the present invention is employed can include a barrier 112 (FIG. 1) used to provide a force against one end of sheets 102 as they are transported in the starwheel 110, causing the sheets 102 to be stopped by the barrier 112 and ejected from the slots 108 in the starwheel 110. Once each sheet 102 is ejected from a slot 108, it is stacked on a stacking platform 114 (FIG. 1) or other surface on other sheets 102 oriented in any manner (dependent at least partially upon the circumferential location of the barrier 112 and the resulting orientation of discharged sheets 102). The starwheel assembly can have a single barrier 112 or can have additional barriers 112, each located adjacent a starwheel 110. As illustrated in FIG. 1, a plurality of barriers 112 allows for the passage of at least one starwheel 110 therebetween by providing a plurality of open spaces between each barrier 112 through which at least one starwheel 110 can move. The barrier 112 or series of barriers 112 can take a number of different forms, such as fingers, plates, rods, and the like of any cross-sectional shape, including without limitation rectangular, circular, semi-circular, triangular, and the like, without departing from the spirit and scope of the present invention.

A completed stack of sheets 102 can be removed to downstream equipment in any conventional manner. In some embodiments of the present invention employing a stacking platform 114 as described above, the stacking platform 114 can be a conveyor capable of transporting a completed stack of sheets 102 to make room for a new stack. In other embodiments, the stacking platform 114 is a bucket connected to a transport system (e.g., a pulley, chain, or cable transport system, a rail transport system, and the like). In still other embodiments, the stacking platform 114 is an elevator, movable toward and away from the starwheel 110 for transporting a completed stack away from the starwheel 110 and returning to a starting position to begin receiving sheets 102 of a new stack. In still other embodiments, the stacking platform 114 is a plate or frame capable of receiving a completed stack of sheets 102, while additional equipment transports the completed stack away from the starwheel 110 to prepare the plate to receive a new stack. The stacking platform 114 can include any device and mechanism capable of receiving the stack from the starwheel, including without limitation a bucket, plate, box, arm, and the like, and can be movable to transport completed stacks of sheets 102 away from the starwheel feed apparatus 100 by conveying belts and pulleys, chains and sprockets, rolls, wheels, rotating bars, and any other conveying devices and mechanisms known to those skilled in the art.

Prior to describing the illustrated starwheel feed apparatus 100 in greater detail, it should be noted that a variety of materials can be fed into and stacked using the starwheel feed apparatus 100. The starwheel feed apparatus 100 of the present invention can be employed to feed any material into one or more starwheels 110. The term "web" is used herein with reference to such materials, and is understood to encompass any material that can be received within a starwheel, including without limitation paper, metal, plastic, rubber or synthetic material, fabric, and the like). In many cases, such material to be received in starwheels is found in sheet form (including without limitation tissue, paper toweling, napkins, foils, wrapping paper, food wrap, woven and non-woven cloth or textiles, and the like). Accordingly, sheets 102 of a paper web are described herein for illustrative purposes only. The term "web" as used herein and in the appended claims does not indicate or imply any particular shape, size, length, width, or thickness of the material.

Similarly, the term "sheet" as used herein and in the appended claims refers generally to a material that is longer and wider than it is thick. However, any shape and size of sheet 102 of any length, width, and thickness can be moved and manipulated by the starwheel feed apparatus 100 without departing from the present invention. Furthermore, a "sheet" can refer to a piece of web material that has been folded and not only single-sheet material. "Sheets" can also or instead refer to items in group form (e.g., bound and unbound signatures, sheets arranged in booklet form, etc.), multiple items of sheet material fed into each starwheel slot, and multiple items of sheet material in folded form (e.g., newspapers, etc.).

Throughout the specification and claims herein, sheets 102 are identified as forming a "stack." This does not necessarily mean that the stack is vertically oriented. Instead, the stack can be horizontally oriented or oriented at any angle between horizontal and vertical orientations and on a downward or an upward slope.

In the following description of the exemplary starwheel feed apparatus 100 illustrated in FIGS. 1, 2, and 7-15, reference is made to a starwheel 110, a first feeding conveyor 104, a second feeding conveyor 106, and a number of other elements and features. Although several of these elements and features are referred to as singular elements and features, it should be noted that in many embodiments, a plurality of such elements and features are employed in the starwheel feed apparatus 100. In particular, FIGS. 2 and 7-15 show only a single starwheel 110, first feeding conveyor 104, second feeding conveyor 106, guiding conveyor 118 barrier 112, and other elements. Although some embodiments can have only those elements that are visible in FIGS. 2 and 7-15, other embodiments employ similar sets of elements not visible or otherwise shown in FIGS. 2 and 7-15. For example, some embodiments employ multiple starwheels 110 rotatable about the same axis (only one of which is therefore shown in FIGS. 2 and 7-15), multiple first feeding conveyors 104 and/or second feeding conveyors 106 (additional conveyor(s) being located behind the feeding conveyors 104, 106 shown in FIGS. 2 and 7-15, and therefore not shown in FIGS. 2 and 7-15) multiple guiding conveyors 118 (configured similarly to the feeding conveyors 104, 106), and the like. For purposes of simplified description, only one set of elements of a starwheel feed apparatus 100 is described below, it being understood, however, that when elements are referred to in singular form, the same description can apply to starwheel feed apparatuses 100 having multiple sets of the same elements.

With reference to the exemplary embodiment of FIGS. 1, 2, and 7-15, sheets 102 of web material, each having a leading edge and a trailing edge, arrive at the starwheel feed apparatus 100 from upstream processes via conveying equipment, and are subsequently fed, leading edge first, into the starwheel slots 108. In some embodiments, the upstream processes advance sheets 102 along at a relatively rapid pace. When the sheets 102 are inserted into the slots 108 of the starwheel 110, a variety of events can occur depending on the speed of the sheet 102 relative to the circumferential speed of the starwheel 110. A sheet 102 can enter a slot 108 so quickly, relative to the circumferential speed of the starwheel 110, that the sheet 102 hits the blind end of the slot 108 at a high speed and buckles, causing the sheet 102 to wrinkle and to be difficult to remove from the slot 108, thereby causing the starwheel 110 to become jammed or blocked. Alternatively, a sheet 102 can enter a slot 108 at a speed relative to the circumferential speed of the starwheel 110 that the sheet 102 hits the blind end of the slot 108 and bounces partially or fully out of the slot 108, in some cases causing the trailing edge of the sheet 102 to hang outside of the slot 108 and over an adjacent starwheel tip 128 as the starwheel 110 rotates. Trailing edges of sheets 102 can therefore snag on starwheel tips 128 and can rip, in some cases leaving a torn sheet 102 of poor quality and/or inadequate size. In addition, such sheets 102 can fly outward of the slots 108 by centrifugal force or can be at least partially removed due to friction between the overhanging trailing edge and surrounding equipment the trailing edge contacts as the starwheel 110 rotates. In other circumstances, sheets 102 will not be fed into the slot 108 completely and adequately, again causing the trailing edge of the sheet 102 to hang outside of the slot 108 and potentially snag on a starwheel tip 128 or be stripped out of the slot 108. Also, sheets 102 that are not properly positioned within the slots 108 can result in stacking imperfections when the sheets are later stripped from the starwheel 110.

Because of the above potential circumstances, the starwheel feed apparatus 110 of the present invention includes one or more guiding conveyors 118 to guide the sheets 102 (and in some embodiments, the trailing edges of the sheets 102) into the slots 108 without causing the sheets 102 to buckle, wrinkle, tear, or be stripped out of the slots 108. As will be discussed in greater detail below, several aspects and characteristics of the guiding conveyor(s) 118 can determine how the sheets 102 are guided into the slots 108, including without limitation the operation speed of the guiding conveyor 118 relative to upstream equipment and the starwheel 110, the amount of contact between the guiding conveyor 118 and the sheets 102 depending on the orientation and position of the guiding conveyor 118 (radially and circumferentially with respect to the starwheel 110), and shape, size and configuration of the guiding conveyor 118, and other factors.

Upstream conveying equipment delivering the sheets 102 to the starwheel feed apparatus 100 and the guiding conveyor (s) can be one or more sets of belts, chains, rolls, rollers, tabletop conveyors, shuttles with any cross-sectional shape, and any other product conveying equipment without departing from the present invention. By way of example only, a combination of rolls, rollers, and belts are shown in the embodiment illustrated in FIGS. 1, 2 and 7-15. As sheets 102 are delivered to the starwheel feed apparatus 100, the sheets 102 in some embodiments are directed into a nip 116 between a first feeding conveyor 104 and a second feeding conveyor 106 as shown in the various embodiments of FIGS. 1-15. The term "nip" as used herein and in the appended claims refers to an area or location between two or more winding or conveying elements, such as between two or more rolls, belts, a roll and a belt, or between any other combination of conveying elements known to those skilled in the art used to transport and support a sheet 102 of web.

It should be noted that the present invention need not necessarily include more than one feeding conveyor. In this regard, the starwheel 110 can be supplied via a single feeding conveyor 104, 106 which transports sheets 102 from upstream operations to a location adjacent the starwheel(s). Particularly, in some embodiments, the starwheel 110 of the present invention can be practiced with the use of only one feeding conveyor 104, 106, such as for sheets 102 resting upon a second feeding conveyor 106 without the first feeding conveyor 104 holding the sheets 102 in place thereon, or for sheets 102 held upon the first feeding conveyor 104 by vacuum force (i.e., the first feeding conveyor being a vacuum belt). In other embodiments, one of the first and second feeding conveyors 104, 106 comprises a fixed surface which contacts the sheets 102. By way of example only, the first feeding conveyor 104 shown in the figures can comprise a fixed surface instead of a conveyor that faces the nip and contacts the sheets 102 as the second feeding conveyor 106 directs the sheets 102 toward the starwheel 110. Although any combination of feeding conveyors 104 can be employed as desired, the use of feeding conveyors 104, 106 in facing relationship with one another can enable the insertion of different types of materials (e.g., folded and unfolded materials, materials having varying thicknesses and material properties, etc.) into the same starwheel 110 having the same starwheel slot size.

As suggested above, the first and/or second feeding conveyors 104, 106 can be one of several first and/or second feeding conveyors of any cross-sectional shape (whether square, rectangular, triangular, circular, and the like), such as a plurality of first and second feeding conveyors 104, 106 running adjacent one another as shown in FIG. 1. Similarly, any number or a series of starwheels 110, barriers 112, guiding conveyors 118, starwheel slots 108, and stacking platforms 114 can be used without departing from the present invention.

The first and second feeding conveyors 104, 106 can be oriented in any manner so as to adequately deliver sheets 102 to the starwheel 110 and to feed the sheets 102 into slots in the starwheel 110. That is, the first and second feeding conveyors 104, 106 do not need to be horizontally disposed as illustrated in FIGS. 1-15, but can instead slope upward or downward with respect to the starwheel 110. In addition, the first and second feeding conveyors 104, 106 need not necessarily run parallel to each other as illustrated in FIGS. 1-15. That is, the feeding conveyors 104, 106 can form a nip 116 that tapers as it reaches the slot 108 or a nip 116 that widens as it reaches the slot 108. Furthermore, in some embodiments, such as those shown in FIGS. 4 and 5, the sheets 102 can be fed by upstream sheet feeding equipment in one direction and fed by the first and second feeding conveyors 104, 106 into the starwheel 110 in another direction.

Figure 2:
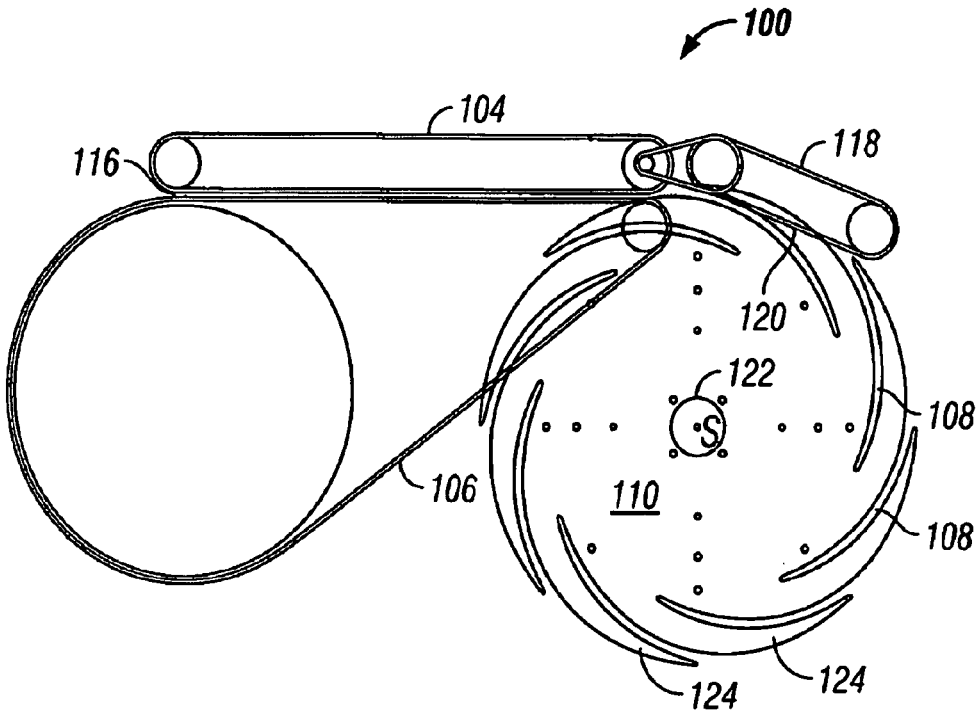
FIG. 2 is a side view of the starwheel feed apparatus illustrated in FIG. 1.
Figure 3:
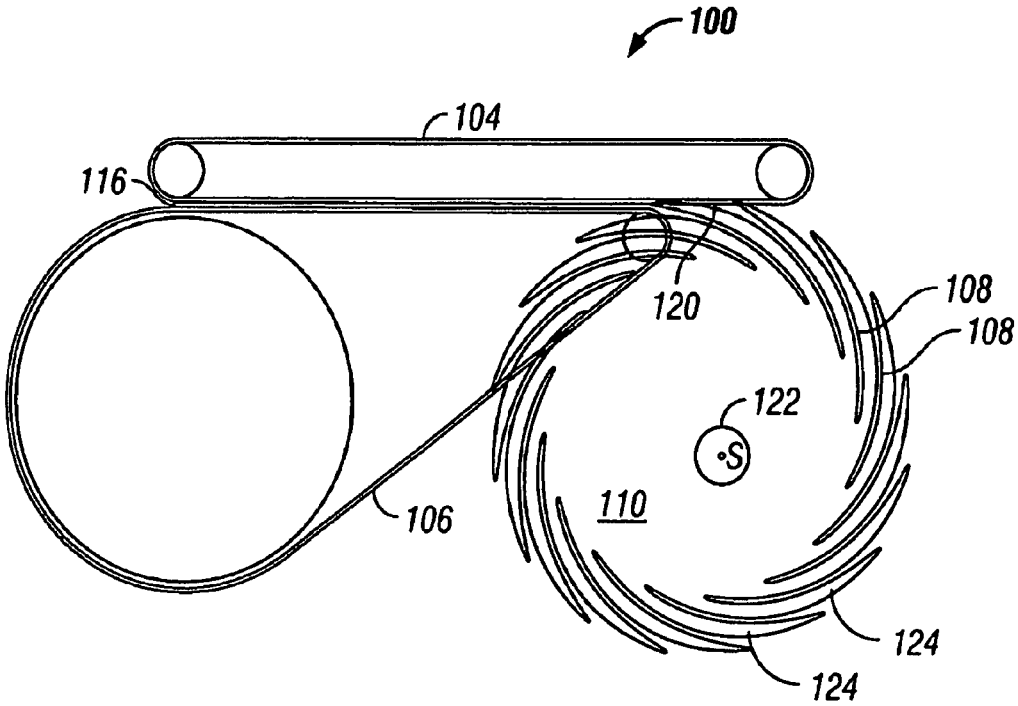
FIG. 3 is a side view of a starwheel feed apparatus according to a second embodiment of the present invention.
Figure 4:
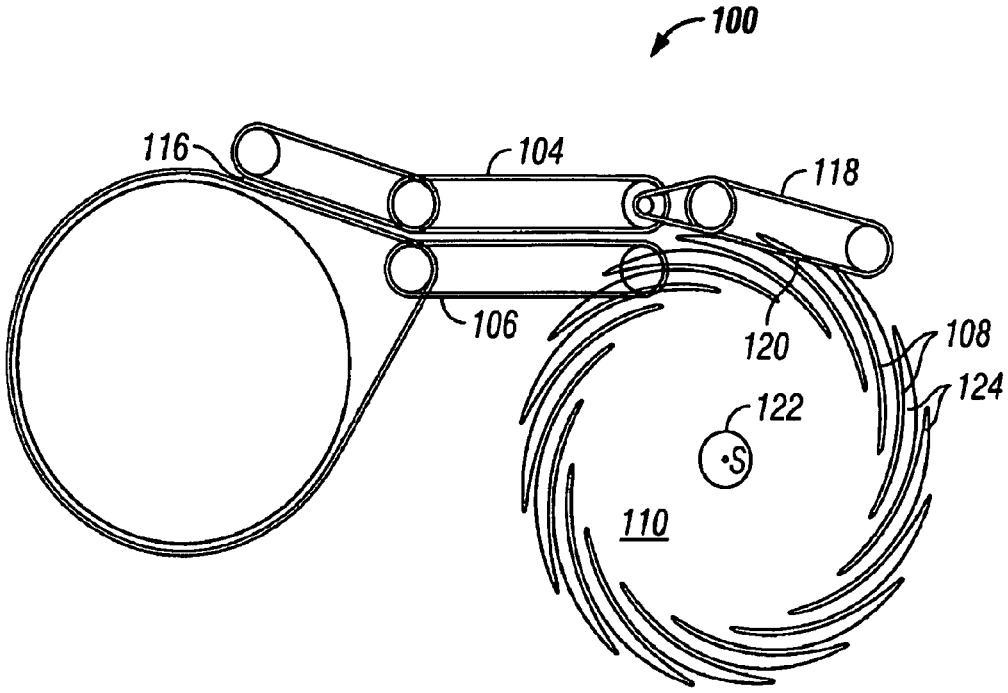
FIG. 4 is a side view of a starwheel feed apparatus according to a third embodiment of the present invention.
Figure 5:
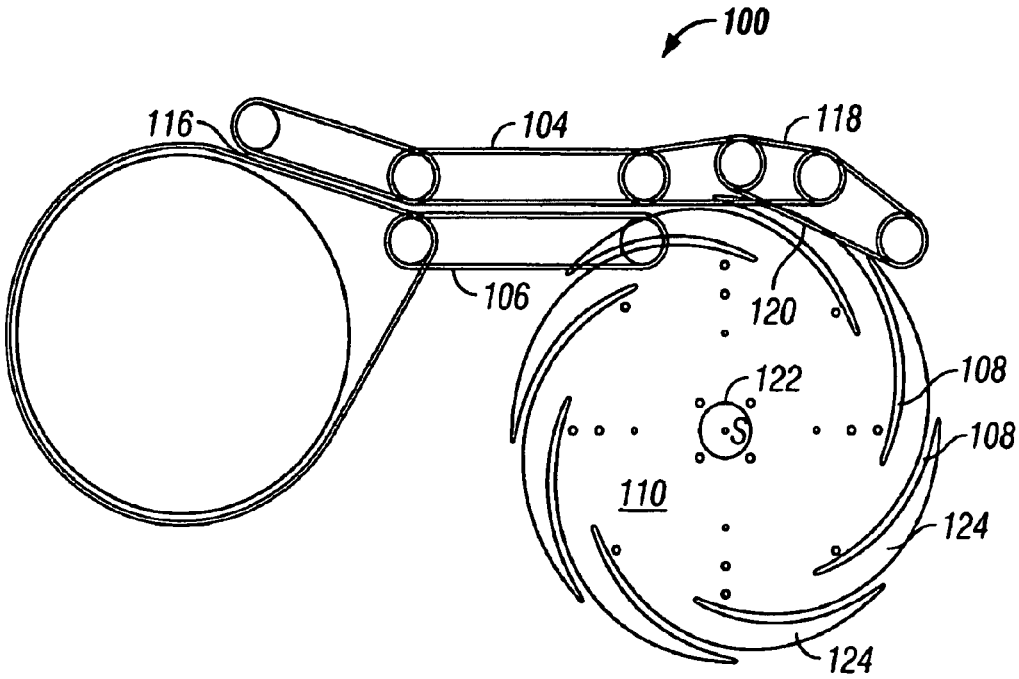
FIG. 5 is a side view of a starwheel feed apparatus according to a fourth embodiment of the present invention.
Figure 6:
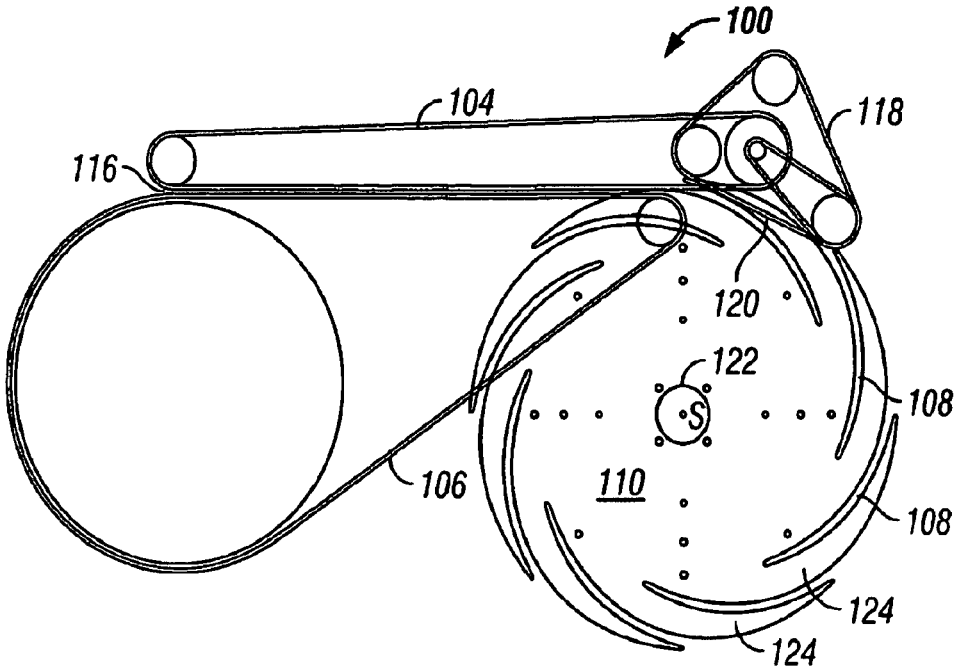
FIG. 6 is a side view of a starwheel feed apparatus according to a fifth embodiment of the present invention.

The first and second feeding conveyors 104, 106 can run any length within the starwheel feed apparatus 100, can comprise any number of conveyors arranged to achieve a desired length, can be at least partially recessed between successive starwheels 110, and can feed sheets 102 into slots 108 of the starwheel 110 from any angle and orientation desired (whether from the top of the starwheel 110, the bottom of the starwheel 110, or at any other location around the starwheel 110). In some embodiments, as illustrated in FIGS. 3 and 4, the first and second feeding conveyors 104, 106 are each comprised of more than one conveyor, and feed sheets 102 into starwheel slots 108 located between the 11 and 12 o'clock positions on the starwheel 110 (11:30 in FIGS. 4 and 5). In other embodiments, as illustrated in FIGS. 2, 3 and 6, the first and second feeding conveyors 104, 106 are each comprised of one conveyor, and similarly feed sheets 102 into starwheel slots 108 located at approximately the 11 o'clock position on the starwheel 110 (as viewed in FIGS. 2, 3 and 6). By way of example only, the first and second feeding conveyors 104, 106 can feed sheets 102 into starwheel slots 108 located at an 11:30 position on the starwheel.

Other embodiments of the present invention, not shown in the appended drawings but within the spirit and scope of the present invention, can comprise any number of first and second feeding conveyors 104, 106 along the path of sheets 102 in the starwheel feed apparatus 100, and run any length within the starwheel feed apparatus 100.

The guiding conveyor 118 can be as few as one guiding conveyor or as many as desired. In some embodiments of the present invention, the guiding conveyor(s) 118 is/are positioned to guide the sheets 102, from leading edge to trailing edge, into the slots 108 in the starwheel 110. In other embodiments, the guiding conveyor 118 is defined by a plurality of conveyors positioned in series to guide and decelerate sheets 102 as they approach the slots 108, and can continue guiding and decelerating the sheets 102 as they enter the slots 108 until the sheets are adequately positioned within the starwheel slots 108. The guiding conveyor 118 can also have any number of cross-sectional shapes, including circular, square, rectangular, triangular, and the like.

Each guiding conveyor 118 used in the starwheel feed apparatus 100 of the present invention can run between two adjacent starwheels 110, as shown in FIGS. 2, 4 and 6-15, and may or may not pass through a cylinder defined by the circumference of the starwheel(s) 110. That is, in some embodiments, the guiding conveyor 118 can be recessed between successive starwheels 110.

The shape of the guiding conveyor 118 or series of guiding conveyors 118 can determine how sheets 102 are guided into the slots 108. In this regard, the guiding conveyor 118 (regardless of whether the guiding conveyor 118 is recessed between starwheels 110) can be at least partially conformed to the periphery of the starwheel 110 to direct sheets 102 into slot 108 of the starwheel 110 after the sheets 102 are initially inserted into the slots 108. The guiding conveyor 118 can conform to any portion of the periphery of the starwheel 110, including without limitation a majority of the periphery, half of the periphery, a quarter of the periphery, an eighth of the periphery, and any other portion of the periphery necessary to adequately guide and/or decelerate sheets 102 as they enter slots 108 in the starwheel 110.

As indicated above, in some embodiments, the guiding conveyor 118 is defined by more than one conveyor (e.g., more than one conveyor belt, roller, and the like) positioned to guide and/or decelerate sheets 102 entering the starwheel 110. In such cases, the plurality of conveyors of the guiding conveyor 118 can be drivably connected so that they can be driven by a common motor or other driving unit. By way of example only, if the guiding conveyor 118 includes two or more conveyor belts arranged in end-to-end fashion, one of the conveyors can be drivably connected to another as shown, for example, in FIG. 5. This connection can be made in any conventional manner, such as by directly or indirectly connecting a rotating axle of one conveyor with the axle of another (e.g., by a belt or chain about the axles or pulleys, sprockets, or drums on the axles, by meshing gears on the axles, and the like). In such cases, the connected conveyors defining the guiding conveyor 118 can be driven by dedicated motors (or other conventional driving devices) or by a common motor. Similarly, the guiding conveyor 118 can be connected to one or more of the feeding conveyors 104, 106 in a similar manner, whether to be driven by the feeding conveyor (s) 104, 106, to drive the feeding conveyor(s) 104, 106, or to be driven by one or more dedicated motors or other conventional driving devices. FIGS. 1, 2 and 4-6 illustrate embodiments of the present invention that employ this manner of driving connection between the first feeding conveyor 104 and one or more conveyors defining the guiding conveyor 118.

The guiding conveyor 118 has a conveying surface 120 (whether defined by one conveyor or by a plurality of conveyors) that is located adjacent the periphery of the starwheel 110 or at least partially inside the periphery of the starwheel 110 (see FIGS. 2, 4 and 6, for example). The conveying surface 120 can have a number of different surface shapes achieved in a number of different manners (see FIGS. 1, 2 and 4-6) for adequately guiding and/or decelerating sheets 102 as they enter slots 108 of the starwheel 110. In some embodiments, such as the embodiment illustrated in FIGS. 4 and 6, the conveying surface 120 of the guiding conveyor 118 running adjacent the starwheel 110 is a single and substantially flat surface oriented at an angle with respect to a sheet path defined by the feeding conveyors 104, 106 to guide sheets 102 as they enter the starwheel slots 108. Accordingly, the conveying surface 120 can be oriented at any angular amount with respect to the sheet path defined by the feeding conveyors 104, 106. The conveying surface 120 illustrated in FIGS. 4 and 6 is defined by a single conveyor. In some embodiments, the conveying surface 120 is oriented at an angle of less than 90° with respect to the feeding conveyors 104, 106 to provide superior sheet guiding results. In other embodiments, such as the embodiment illustrated in FIG. 5, the conveying surface 120 of the guiding conveyor 118 adjacent the starwheel 110 is substantially concave, at least partially conforms to the circumference of the starwheel 110, and is achieved by using two conveyors positioned in series (in end-to-end relationship). In still other embodiments, such as the embodiment illustrated in FIG. 6, the conveying surface 120 of the guiding conveyor 118 is again a flat surface oriented at an angle with respect to the sheet path defined by the feeding conveyors 104, 106 to properly guide sheets entering the starwheel slots 108, and is defined by a conveyor passed about more than two rotating elements (in the illustrated exemplary embodiment, thereby resulting in a triangular-shaped guiding conveyor).

Any number of other shapes of guiding conveyors 118 can be used in the present invention, and can be achieved by one or more conveyors that are located adjacent one another and/or are drivably connected, including without limitation rectangular, circular, trapezoidal, irregular, and any other shape or design capable of adequately guiding sheets 102 into slots 108 of the starwheel 110. Additionally, any number of other surface shapes can be used for the conveying surface 120 of the guiding conveyor 118 presented to the sheets 102, including without limitation convex, concave, flat, wavy or bumpy, corrugated, ribbed, and any other conveying surface 120 capable of guiding sheets 102 into the slots 108 of the starwheel 110.

The guiding conveyor 118 (whether defined by one conveyor or a plurality of conveyors) is used to guide and/or decelerate sheets 102 as they enter the slots 108 of the starwheel 110. The guiding conveyor 118 can be driven at a speed greater than that of the feeding conveyor(s) 104, 106 to accelerate and feed thick sheets, for example, into the starwheel 110. The guiding conveyor 118 can be driven at a slower speed than the feeding conveyor(s) 104, 106 and thus decelerate advancing sheets 102. The guiding conveyor 118 can be driven in this manner by one or more dedicated motors driven to run the guiding conveyor 118 at a slower speed than the feeding conveyors 104, 106. Alternatively, the guiding conveyor 118 can instead be driven in this manner by drivably coupling the guiding conveyor 118 to one or more of the feeding conveyors 104, 106 by a conventional speed reduction connection (e.g., a pulley, sprocket, or drum on a feeding conveyor 104 driving a larger pulley, sprocket, or drum on the guiding conveyor 118 via a belt, chain, and the like). By way of example only, FIGS. 1, 2, 4, and 6 show a guiding conveyor belt 118 rotating at one end about an axle drivably coupled to an axle of the first feeding conveyor 104 through a speed reduction. In some embodiments, such as the embodiment illustrated in FIG. 1 for example, the speed reduction connection can be accomplished with the use of one drive belt to drivably couple the first feeding conveyor 104 and the guiding conveyor 118.

Thus, the ratio of feeding conveyor velocity (or the velocity of upstream equipment) to guiding conveyor velocity can be greater than 1:1, and in some embodiments is within a range of between 1:1 and 4:1. In some embodiments of the present invention, the ratio of feeding conveyor velocity (or the velocity of upstream equipment) to guiding conveyor velocity is within a range of 1:1 and 3:1. In other embodiments, the ratio of feeding conveyor velocity (or the velocity of upstream equipment) to guiding conveyor velocity is approximately 1.75:1. Good results have been obtained when the ratio of feeding conveyor velocity (or the velocity of upstream equipment) to guiding conveyor velocity is approximately 2.27:1. Stated another way, good results have been obtained when the guiding conveyor velocity is approximately 44% of feeding conveyor (or upstream equipment) velocity.

Although the guiding conveyor 118 illustrated in the figures is defined by one or more belt conveyors, it will be appreciated that the guiding conveyor 118 can also be operated at a slower velocity than the feeding conveyors 104, 106 if the conveyor(s) defining the guiding conveyor 118 were instead rolls, wheels, rotating bars, vacuum conveyors, vacuum rolls, and any other device or mechanism capable of conveying and/or guiding sheets 102 as described above.

As mentioned above, in some embodiments the guiding conveyor 118 can be driven independently from the other equipment (i.e., feeding conveyors 104, 106, upstream equipment, and the like). This manner of driving the guiding conveyor 118 also enables the guiding conveyor 118 to be driven at a slower velocity than the feeding conveyor(s) 104, 106, if desired. In some embodiments, the guiding conveyor 118 can even be directly or indirectly driven (in any manner described above) in a direction opposite that of the feeding conveyor(s) 104, 106, thus causing sheets 102 to decelerate as they approach and/or enter slots 108 in the starwheel 110.

In some embodiments of the present invention, the guiding conveyor 118 is not solely responsible for decelerating sheets 102, but rather the feeding conveyors 104, 106 participate in the deceleration of the sheets 102. The feeding conveyors 104, 106 can act in decelerating sheets 102 by employing the same mechanisms and in any of the manners described above with regard to the guiding conveyor 118. In this regard, the velocity of the feeding conveyors 104, 106 can be between that of upstream equipment and the guiding conveyor 118 to thereby decelerate sheets 102 prior to reaching the guiding conveyor 118. In such cases, the ratio of the velocity of the upstream equipment to that of the feeding conveyors 104, 106 is greater than 1:1. Any ratio of the velocity of the upstream equipment to that of the feeding conveyors 104, 106 that is capable of decelerating sheets 102 as they are fed toward the starwheel 110 can be selected as desired (similar to the case for the guiding conveyor 118). Alternatively, the velocity of the feeding conveyors 104, 106 can be greater than the velocity of the upstream equipment to provide a variety of other sheet feeding effects, including providing distance between successive sheets 102 to allow sufficient time to feed each sheet 102 into the starwheel 110. Good results have been obtained when the ratio of the velocity of the upstream equipment to that of the feeding conveyors 104, 106 is approximately 1.015:1.

Furthermore, the ratio of the velocity of a point on the guiding conveyor 118 to a point on the periphery of the starwheel 110 can be varied to accommodate a variety of sheet materials, shapes and sizes. This velocity difference can be accomplished by changing the rotational speed of the starwheel 110 (and/or the guiding conveyor 118) and/or the size (i.e., diameter) of the starwheel 110. In some embodiments of the present invention, the velocity of the guiding conveyor 118 is less than starwheel tip velocity (or the velocity of the periphery of the starwheel 110). In other embodiments, the velocity of the guiding conveyor 118 is the same as the starwheel tip velocity, and in still other embodiments, the velocity of the guiding conveyor 118 is greater than the starwheel tip velocity. More specifically, in some embodiments of the present invention, the ratio of the velocity of the guiding conveyor 118 to the starwheel tip velocity is within a range of 1:1 to 5:1. In other embodiments, the ratio of the velocity of the guiding conveyor 118 to the starwheel tip velocity is within a range of 1:1 to 3.5:1. In other embodiments, the ratio of the velocity of the guiding conveyor 118 to the starwheel tip velocity is within a range of 1.5:1 to 2.5:1. In still other embodiments, the ratio of the velocity of the guiding conveyor 118 to the starwheel tip velocity is at least 1.2:1. In yet other embodiments, the ratio of the velocity of the guiding conveyor 118 to the starwheel tip velocity is less than 4:1. Good results have been obtained when the ratio of the velocity of the guiding conveyor 118 to the starwheel tip velocity is approximately 1.43:1. Good results have also been obtained when the ratio of the velocity of the guiding conveyor 118 to the starwheel tip velocity is approximately 3.2:1. Of course, these velocity ratios are dependent on the size (i.e., diameter) of the starwheel 110 and the number of slots 108 in the starwheel 110. In some embodiments, the starwheel diameter is within a range of approximately 15" to 25". Good results have been obtained with a starwheel having a diameter of approximately 20".

In some embodiments, the starwheel 110 comprises 8 slots 108 (a 12" diameter starwheel 110, by way of example only). In other embodiments, the starwheel 110 comprises 12 slots 108. In yet other embodiments, the starwheel 110 comprises 16 slots 108. Although the ratio of the feeding conveyors 104, 106 to starwheel tip velocity can be impacted by the chosen diameter of the starwheel 110 and the number of slots 108 therein, in some embodiments, the ratio of the velocity of the feeding conveyors 104, 106 (or upstream equipment) to the ratio of the starwheel tip velocity (or the velocity of a point on the periphery of the starwheel 110) is at least approximately 4:1. In other embodiments, the ratio of the velocity of the feeding conveyors 104, 106 (or upstream equipment) to the ratio of the starwheel tip velocity is at least approximately 3:1. In still other embodiments, the ratio of the velocity of the feeding conveyors 104, 106 (or upstream equipment) to the ratio of the starwheel tip velocity is at least approximately 2:1. By way of example only, the ratio of the velocity of the feeding conveyors 104, 106 (or upstream equipment) to the ratio of the starwheel tip velocity for an 8-slot starwheel 110 can be approximately 2:1. As another example, the ratio of the velocity of the feeding conveyors 104, 106 (or upstream equipment) to the ratio of the starwheel tip velocity for an 12-slot starwheel 110 can be approximately 3.2:1. In still another example, the ratio of the velocity of the feeding conveyors 104, 106 (or upstream equipment) to the ratio of the starwheel tip velocity for an 16-slot starwheel 110 can be approximately 4:1.

In other embodiments, the entering speed of the sheet 102 can be controlled to change the end location of the sheet 102 in the slot 108 as desired (e.g., to place the sheet 102 in any depth in the slot 108, to cause the sheet 102 to bounce back from the bottom of the slot 108, to avoid the sheet 102 reaching the bottom of the slot 108, and the like). This control is enabled by controlling the amount of contact generated between the guiding conveyor 118 and the sheet 102, which in turn is controlled by adjusting the position and orientation of the guiding conveyor 118 with respect to the incoming sheet 102. In particular, by moving the guiding conveyor 118 closer to the starwheel 110 and/or in a position generating more interference with the path of the incoming sheet 102, the guiding conveyor 118 can generate more deceleration of the incoming sheet 102. Similarly, by moving the guiding conveyor 118 farther away from the starwheel 110 and/or in a position generating less interference with the path of the incoming sheet 102, the guiding conveyor 118 can generate less deceleration of the incoming sheet 102. In other embodiments, control of sheet speed by the guiding conveyor 118 is enabled by increasing or decreasing the speed of the guiding conveyor 118 with respect to the feeding conveyors 104, 106. This alternative manner of controlling sheet speed can be employed as an alternative or in addition to controlling sheet speed by guiding conveyor position and orientation described above. For example, the guiding conveyor 118 can be first positioned to obtain the desired interference and control, and secondly, the speed of the guiding conveyor 118 can be set to insert the sheets 102 properly into the slots 108.

A number of different conveying devices can be used as first and second feeding conveyors 104, 106 and a guiding conveyor 118 without departing from the present invention, including without limitation belts and pulleys, chains and sprockets, one or more rolls, wheels, or rotating bars, and any other device or mechanism capable of conveying and feeding sheets 102 into slots 108, or of conveying, guiding and/or decelerating the sheet 102 approaching and/or entering a slot 108 of the starwheel 110. As used herein and in the appended claims, the term "conveyor belt(s)" is employed to refer to and encompass any such conveying device. Furthermore, the conveying devices used for the first feeding conveyor 104, the second feeding conveyor 106, and the guiding conveyor 118 can be the same or different. In some embodiments of the present invention, as shown in FIG. 3, the sheet 102 can be guided into a slot 108 of the starwheel 110 simply by extending the first feeding conveyor 104 further adjacent a periphery of the starwheel 110 (i.e., a separate guiding conveyor 118 is not employed). Other embodiments of the present invention employ a guiding conveyor 118 or a series of guiding conveyors 118 in addition to feeding conveyor(s) 104, 106 (see FIGS. 1, 2 and 4-6). Whether the guiding conveyor 118 is defined by a single guiding conveyor 118 or a series of guiding conveyors 118, the guiding conveyor 118 defines a conveying surface 120 having a length along which the trailing edge of a sheet 102 is guided into a slot 108 of the starwheel 110.

The feeding conveyors 104, 106 and the guiding conveyor 118 can be driven by a number of different mechanisms (not shown), including without limitation electric, hydraulic, or pneumatic motors. In addition, the feeding conveyors 104, 106 and the guiding conveyor 118 can be driven directly or indirectly (e.g., via one or more gears, belts, chains, and the like), whether from a folder or other upstream equipment or otherwise.

The sheet path defined by the conveyors 104, 106, 118 can have a number of different shapes, including without limitation straight, curved, circular, or zig-zag shapes, and any combination of such shapes. In short, the conveyors 104, 106, 118 can define any path shape in which sheets 102 are transported to the starwheel 110 and into slots 108 of the starwheel 110.

In some embodiments of the present invention, one or more of the conveyors 104, 106, 118 can be moved to different positions with respect to the starwheel 110. Such adjustability can be performed in a number of manners, such as by connecting a frame or axle(s) of one or more conveyors 104, 106, 118 to a rail for movement and attachment at different locations along the rail, by connecting a frame or axles(s) of one or more conveyors 104, 106, 118 to one or more actuators (e.g., hydraulic or pneumatic cylinders, solenoids, screws, and the like) or to a carriage movable in any conventional manner (e.g., by one or more hydraulic or pneumatic cylinders, solenoids, screws, and the like), by connecting one or more conveyors 104, 106, 118 to an adjustable cam generating movement of the conveyor(s) 104, 106, 118 upon rotation of the cam, and the like.

In those embodiments in which one or more of the conveyors 104, 106, 118 are movable with respect to the starwheel 110 as just described, this movement can be to different orientations with respect to the starwheel 110 and/or different radial or circumferential positions with respect to the periphery of the starwheel 110 in the plane of the page of FIGS. 2-15.

In some embodiments, any one or more of the conveyors 104, 106, 118 are adjustable to different circumferential positions adjacent the starwheel 110, to different orientations with respect to the starwheel 110, and/or to different radial distances from the periphery of the starwheel 110. The conveyors 104, 106, 118 can be positioned in different arrangements with respect to one another, such as to define a straight or substantially straight path to the periphery of the starwheel 110, an arcuate or circular path to follow a portion of the circumference of the starwheel 110, an angled path defined by a series of straight paths, and the like. In each such case, one or more of the conveyors 104, 106, 118 can be adjustable to different positions as desired in any conventional manner. For example, any one or more of the conveyors 104, 106, 118 can be rotatable or pivotable about an axis to be able to tip toward and away from the starwheel 110. In still other embodiments, none of the conveyors 104, 106, 118 are adjustable.

In some embodiments, the first and second feeding conveyors 104, 106 are secured in place with respect to the starwheel 110, while the guiding conveyor 118 is movable to different positions with respect to the starwheel 110. In other embodiments, the feeding conveyors 104, 106 are movable to different positions with respect to the starwheel 110, while the guiding conveyor 118 is secured in place with respect thereto. In yet other embodiments, one of the first and second feeding conveyors 104, 106 is movable with the guiding conveyor 118 to different positions with respect to the starwheel 110, while the second feeding conveyor 106 is stationary. Other conveyor configurations are also possible and within the spirit and scope of the present invention.

In some cases, one or more of the conveyors 104, 106, 118 are defined by a conveyor path in which the conveyor moves. By way of example only, the conveyors 104, 106, 118 in the illustrated exemplary embodiment employ belts passed about rotating elements to convey, guide, and/or decelerate sheets 102 as discussed in greater detail above. The paths of these conveyors overlap in some cases, and do not overlap in others. For example, the paths of the feeding conveyors 104, 106 in FIGS. 2 and 4 do not overlap with the path of the guiding conveyor 118. As other examples, the path of the feeding conveyor 104 in FIG. 5 overlaps with the path of the guiding conveyor 118 by virtue of their driving connection, while the path of the feeding conveyor 104 in FIG. 6 overlaps with the path of the guiding conveyor 104 by virtue of an end of the feeding conveyor 104 being located laterally adjacent the guiding conveyor 118. In the embodiment of FIG. 6, the feeding conveyor 104 is extended further over the periphery of the starwheel 110, and is drivably connected to the guiding conveyor 118 (of which one of the legs of the triangular guiding conveyor 118 defines the conveying surface 120 adjacent the starwheel 110).

FIGS. 7-15 show the starwheel feed apparatus of FIGS. 1 and 2 in operation as a sheet 102 is advanced in the nip 116 between the first and second feeding conveyors 104, 106 toward the starwheel 110, inserted into one of eight slots 108 in an exemplary starwheel 110, guided and decelerated into the slot 108 by the guiding conveyor 118, transported clockwise (as viewed in FIGS. 7-15) in the starwheel 110, abutted against the barrier 112, ejected from the slot 108 as the starwheel 110 continues moving past the barrier 112, and stacked upon at least one other sheet 102 on a stacking platform 114.

Figure 7:
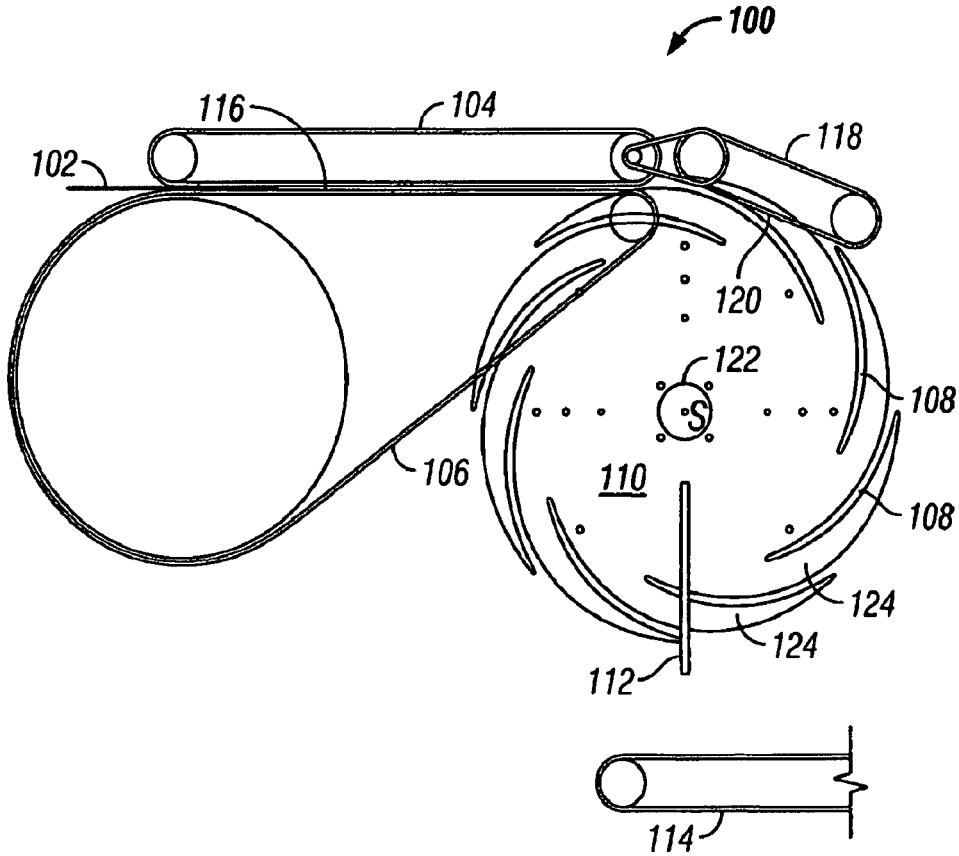
FIGS. 7-15 are side views of the starwheel feed apparatus illustrated in FIGS. 1 and 2, shown in different stages of operation as a sheet of web is advanced through the starwheel feed apparatus and an adjacent starwheel.

FIG. 7 shows a sheet 102 approaching from upstream equipment and advancing in the nip 116 between the first and second feeding conveyors 104, 106 to the right toward a starwheel 110. In this embodiment, the sheet 102 is moving at the same speed as that of the upstream equipment and is about to be decelerated by the guiding conveyor 118. The guiding conveyor in FIGS. 7-15 is capable of decelerating the sheet 102 as it guides the sheet 102 into a slot 108 of the starwheel 110. In this regard, the guiding conveyor 118 in this embodiment is driven by the first feeding conveyor 104 at a speed slower than the first feeding conveyor 104 by a speed reduction assembly (e.g., small and large pulleys or sprockets on the axles of the first feeding conveyor 104 and the guiding conveyor 118, respectively, and driven by a belt or chain about the pulleys or sprockets). The starwheel 110 is rotating clockwise about the axis S.

Figure 8:
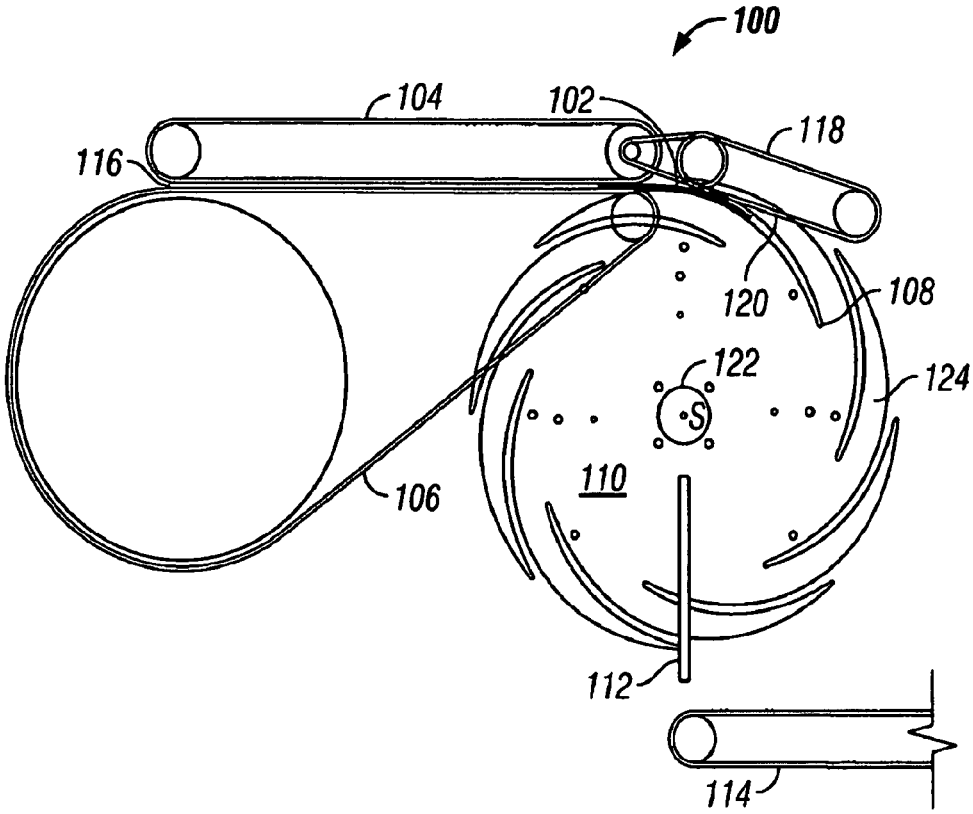

FIG. 8 shows the sheet 102 being fed from the nip 116 into a slot 108 in the starwheel 110 by the first and second feeding conveyors 104, 106. The sheet 102 is about to be decelerated and guided into the slot 108 by the guiding conveyor 118.

Figure 9:
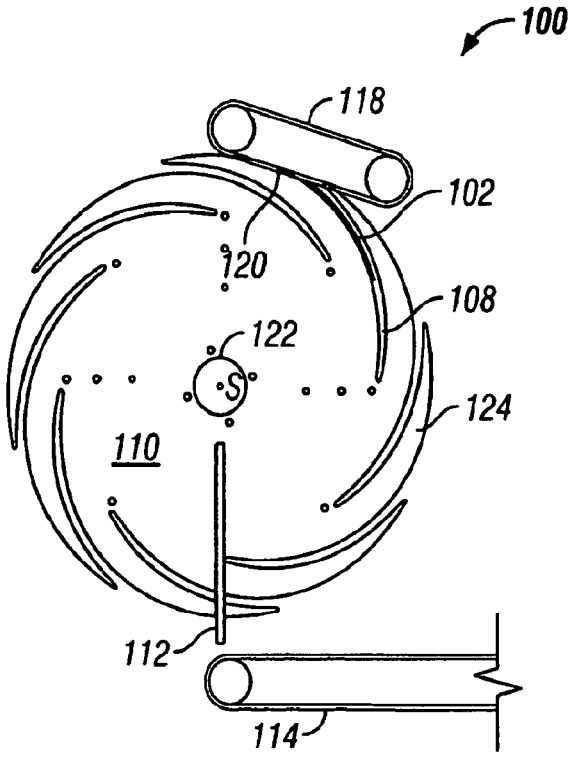

FIG. 9 illustrates the sheet 102 as it is decelerated and guided into the slot 108 by the guiding conveyor 118 as the starwheel 110 is rotated clockwise.

Figure 10:
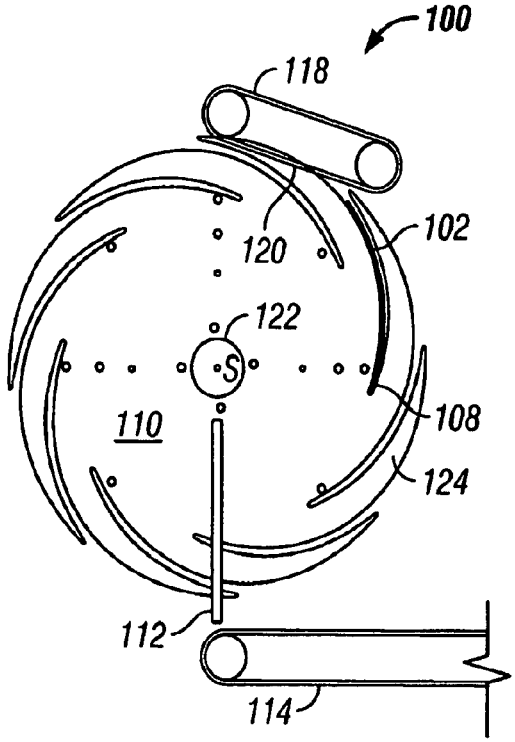

FIG. 10 shows that upon entering the slot 108, the sheet 102 almost reaches the bottom of the slot 108 without bouncing back out of the slot 108 or buckling on contact with the blind end of the slot 108. The sheet 102 has been successfully inserted into the slot 108 without snagging on any fin tips 128.

Figure 11:
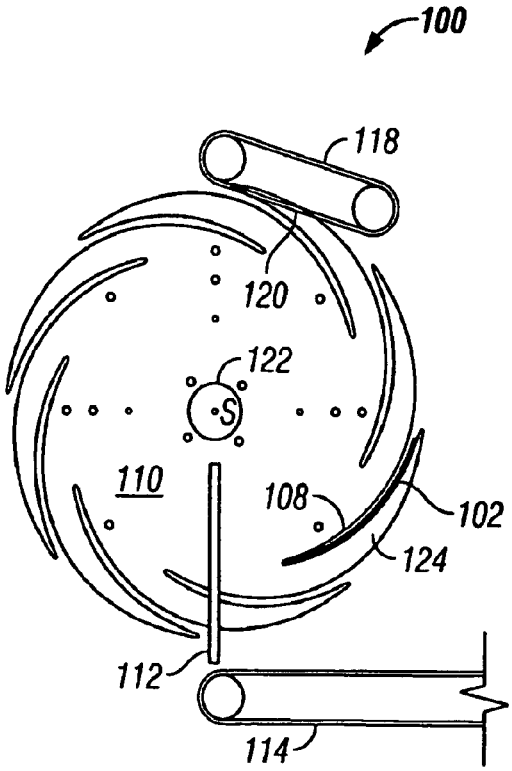

FIG. 11 depicts the sheet 102 travelling with the starwheel 110 while being supported in the slot 108 as the starwheel 110 is rotated clockwise. Due to adequate sheet insertion, the sheet 102 has not bounced back from the bottom of the slot 108 or been prevented from full insertion and remains in the proper position within the slot 108 as it is transported in the starwheel 110.

Figure 12:
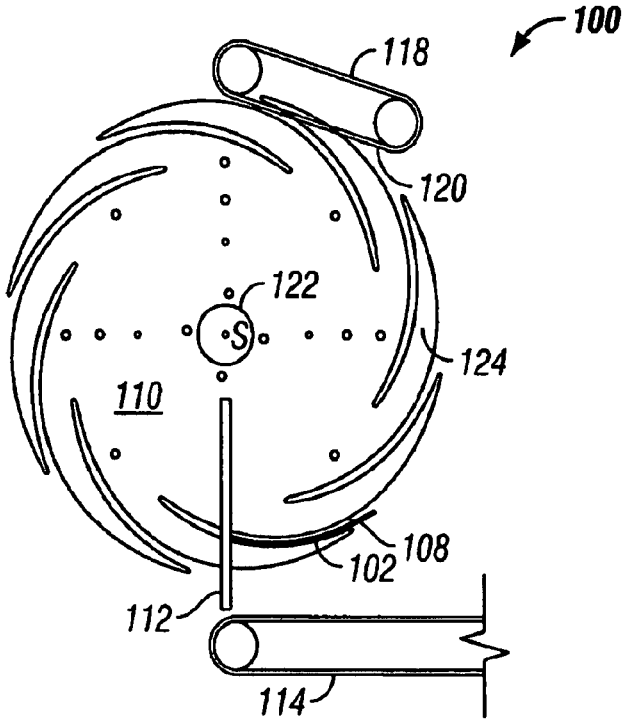

FIG. 12 shows the sheet 102 with one end contacting the barrier 112 oriented vertically and located below the axis S of the starwheel 110. The sheet 102 is about to be ejected from the starwheel 110 as the slot 108 holding the sheet 102 is transported past the barrier 112.

Figure 13:
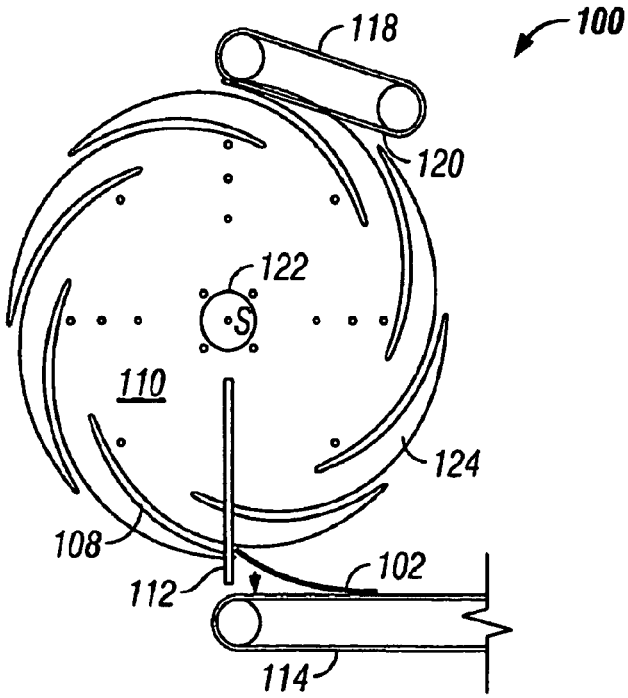

FIG. 13 shows the sheet 102 before it has entirely exited the slot 108. Due to the curve and orientation of the slot 108, the sheet 102 is adequately positioned to be laid upon the stacking platform 114.

Figure 14:
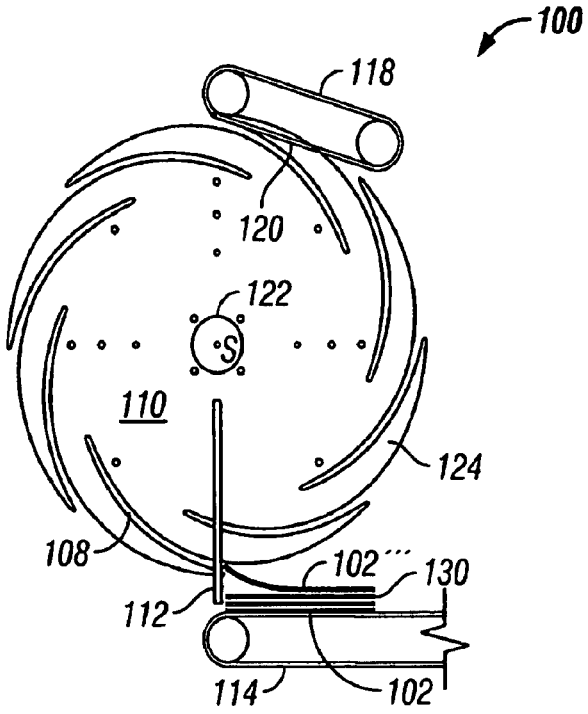

FIG. 14 shows a sheet 102''' being ejected from the slot 108 as the starwheel 110 is rotated. The sheet 102''' is released and, due to the orientation of the illustrated exemplary embodiment, dropped upon a nearly completed stack 130 on the stacking platform 114.

Figure 15:
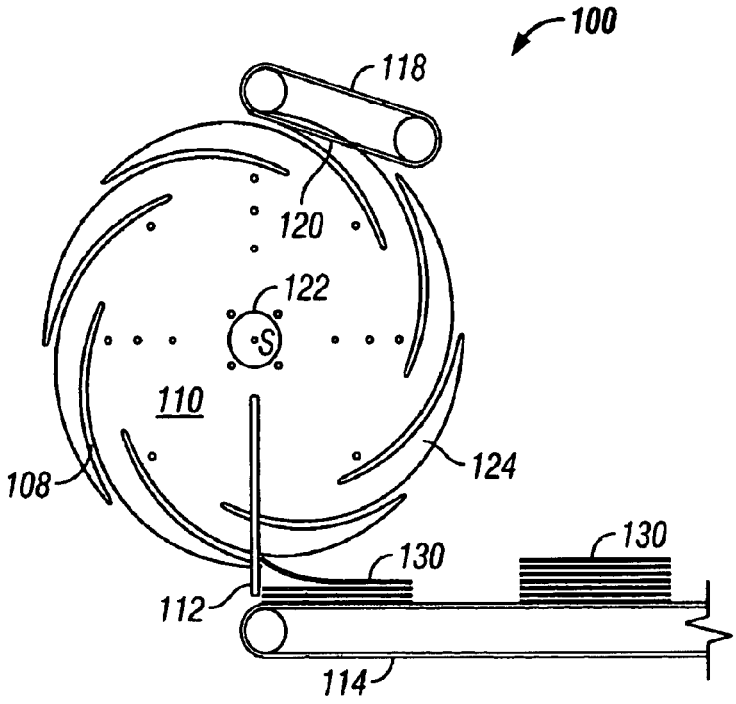

FIG. 15 shows the completed stack 130 being transported away from the starwheel feed apparatus 100 toward the downstream processes via a conveyor belt functioning as the stacking platform 114. A new stack 130' is about to receive another sheet 102 as it is ejected from a slot 108 in the starwheel 110.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the embodiments illustrated in FIGS. 1-15 show the starwheel feed apparatus 100 with the barrier 112 and the stacking platform 114 oriented such that they are located below the center axis S of the starwheel 110, with the conveyors 104, 106, 118 positioned above the starwheel 110 and running substantially horizontally. However, the starwheel feed apparatus 100 of the present invention need not necessarily be oriented in this way. In some embodiments (not shown, but described from the perspective of FIGS. 2-15, assuming clockwise rotation of the starwheel 110), the feeding conveyors 104, 106 feed sheets 102 into slots 108 of the starwheel 110 at the bottom of the starwheel 110, the guiding conveyor 118 guides and/or decelerates the sheets 102 into the slots 108 along any portion of the starwheel periphery between the feeding conveyors 104, 106 and the barrier 112, and the barrier 112 located vertically above the axis S forces the sheet 102 out of the slot 108 onto a stacking platform 114 located adjacent the starwheel 110 just below the barrier 112.

In other embodiments, the feeding conveyors 104, 106 direct sheets 102 radially into the starwheel 110 from a twelve o'clock position (from the perspective of FIGS. 2-15), running substantially vertically. In still other embodiments, the feeding conveyors 104, 106 direct sheets 102 into slots 108 in the starwheel 110 at a nine o'clock position on the starwheel 110, the guiding conveyor 118 guides and/or decelerates the sheets 102 as they travel in the starwheel 110, and the sheets 102 are discharged from the starwheel 110 on an opposite side of the starwheel 110 (at a three o'clock position in a substantially horizontal orientation, in which case the barrier 112 can perform the functions of both the barrier 112 and the stacking platform 114). In yet other embodiments, the feeding conveyors 104, 106 can be positioned to insert sheets 102 into slots 108 in the starwheel 110 at a ten o'clock position of the starwheel 110 (when viewed from the perspective of FIGS. 2-15), the guiding conveyor 118 guides and/or decelerates the sheets 102 along any portion of the starwheel 110 between the feeding conveyors 104, 106 and the barrier 112, and the barrier 112 can be positioned in a three o'clock position of the starwheel 110 such that sheets 102 are discharged from the starwheel 110 in a substantially vertical orientation and are stacked in a horizontal direction. The feeding conveyors 104, 106, the barrier 112, and the stacking platform 114 can be positioned at any angular location about the axis S independent of each other in order to feed sheets 102 into the starwheel 110 and to discharge the sheets 102 without departing from the spirit and scope of the present invention.

We claim:

1. A sheet guiding apparatus for guiding a sheet of web material as the sheet is fed into a starwheel from upstream sheet feeding equipment, the starwheel having slots and being rotatable to receive and discharge the sheet; the sheet guiding apparatus comprising:

a conveyor belt located adjacent the starwheel at a location downstream of the upstream feeding equipment;

a conveying surface defined at least partially by the conveyor belt, the conveying surface positioned to contact and guide a trailing edge of the sheet as the sheet enters the starwheel; and wherein the starwheel has a center and an outer radius, and wherein at least a portion of the conveyor belt is located at a radial position less than the outer radius of the starwheel with respect to the center of the starwheel.

2. The apparatus as claimed in claim 1, wherein the conveyor belt is one of a plurality of conveyor belts.

3. The apparatus as claimed in claim 2, wherein the plurality of conveyor belts is arranged end-to-end.

4. The apparatus as claimed in claim 3, wherein the conveying surface is defined by the plurality of conveyor belts arranged end-to-end, and is concave with respect to the starwheel.

5. The apparatus as claimed in claim 1, wherein the plurality of conveyor belts is arranged side-by-side.

6. The apparatus as claimed in claim 1, wherein the conveying surface is adjustable to different positions with respect to the starwheel, the conveying surface being adjustable toward and away from the starwheel to increase and decrease contact between the conveying surface and the sheet.

7. The apparatus as claimed in claim 1, wherein the starwheel has a periphery, and wherein a point on the conveyor belt moves at substantially the same velocity as that of a point on the periphery of the starwheel.

8. The apparatus as claimed in claim 1, wherein the starwheel has a periphery, and wherein a point on the conveyor belt moves at a velocity greater than that of a point on the periphery of the starwheel.

9. The apparatus as claimed in claim 1, wherein the starwheel has a periphery, wherein a point on the conveyor belt moves at a first velocity and a point on the periphery of the starwheel moves at a second velocity, and wherein the ratio of the first velocity to the second velocity is at least 1.2:1.

10. The apparatus as claimed in claim 1, wherein the starwheel has a periphery, wherein a point on the conveyor belt moves at a first velocity and a point on the periphery of the starwheel moves at a second velocity, and wherein the ratio of the first velocity to the second velocity is approximately 1.43:1.

11. The apparatus as claimed in claim 1, wherein the starwheel has a periphery, wherein a point on the conveyor belt moves at a first velocity and a point on the periphery of the starwheel moves at a second velocity, and wherein the ratio of the first velocity to the second velocity is less than 4:1.

12. The apparatus as claimed in claim 1, wherein the starwheel has a periphery, wherein a point on the conveyor belt moves at a first velocity and a point on the periphery of the starwheel moves at a second velocity, and wherein the ratio of the first velocity to the second velocity is approximately 3.2:1.

13. The apparatus as claimed in claim 1, wherein the upstream sheet feeding equipment moves the sheet at a first velocity and the conveyor belt moves at a second velocity, and wherein the ratio of the first velocity to the second velocity is at least 1:1.

14. The apparatus as claimed in claim 1, wherein the upstream sheet feeding equipment moves the sheet at a first velocity and the conveyor belt moves at a second velocity, and wherein the ratio of the first velocity to the second velocity is between 1:1 and 4:1.

15. The apparatus as claimed in claim 1, wherein the upstream sheet feeding equipment moves the sheet at a first velocity and the conveyor belt moves at a second velocity, and wherein the ratio of the first velocity to the second velocity is between 1:1 and 3:1.

16. The apparatus as claimed in claim 1, wherein the upstream sheet feeding equipment moves the sheet at a first velocity and the conveyor belt moves at a second velocity, and wherein the ratio of the first velocity to the second velocity is approximately 1.75:1.

17. The apparatus as claimed in claim 1, wherein the upstream sheet feeding equipment moves the sheet at a first velocity and the conveyor belt moves at a second velocity, and wherein the ratio of the first velocity to the second velocity approximately 2.27:1.

18. A sheet guiding apparatus for guiding a sheet of web material as the sheet is fed into a starwheel from upstream sheet feeding equipment, the starwheel having slots and being rotatable to receive and discharge the sheet; the sheet guiding apparatus comprising:

a conveyor belt located adjacent the starwheel at a location downstream of the upstream feeding equipment; and a conveying surface defined at least partially by the conveyor belt, the conveying surface positioned to contact and guide a trailing edge of the sheet as the sheet enters the starwheel;

wherein the conveyor belt is drivably connected to the upstream sheet feeding equipment.

19. The apparatus as claimed in claim 18, wherein the conveyor belt is drivably connected to the upstream sheet feeding equipment through a speed reduction.

20. A method of feeding sheets of a web material into a starwheel using a starwheel feed apparatus, the starwheel having at least one slot and the starwheel feed apparatus having at least one conveyor belt adjacent the starwheel; the method comprising:

moving a sheet to the starwheel with upstream sheet feeding equipment;

advancing the sheet along the at least one conveyor belt;

feeding the sheet into one of the at least one slot of the starwheel with the upstream sheet feeding equipment;

contacting the sheet downstream of the upstream sheet feeding equipment with the at least one conveyor belt as the sheet enters the starwheel;

rotating the starwheel; and contacting the sheet and guiding the sheet into the at least one slot with the at least one conveyor belt.

21. The method as claimed in claim 20, further comprising decelerating the sheet by operating the conveyor belt at a speed less than that of the upstream sheet feeding equipment.

22. The method as claimed in claim 20, further comprising:

moving the sheet adjacent at least one barrier;

ejecting the sheet from the at least one slot; and stacking the sheet upon at least one other sheet.

23. The method as claimed in claim 20, wherein the conveyor belt has a conveying surface and the conveying surface has a length, and further comprising guiding a trailing edge of the sheet along the length of the conveying surface into the at least one slot.

24. The method as claimed in claim 20, wherein moving a sheet to the starwheel with upstream sheet feeding equipment includes moving the sheet at a first velocity, and wherein advancing the sheet along the at least one conveyor belt includes advancing the conveyor belt at a second velocity.

25. The method as claimed in claim 24, wherein the first velocity is greater than the second velocity.

26. The method as claimed in claim 25, wherein the ratio of the first velocity to the second velocity is approximately 1.75:1.

27. The method as claimed in claim 25, wherein the ratio of the first velocity to the second velocity is approximately 2.27:1.

28. The method as claimed in claim 20, wherein advancing the sheet along the at least one conveyor belt includes advancing the sheet at a first velocity, and wherein rotating the starwheel includes moving a periphery of the starwheel at a second velocity different than the first velocity.

29. The method as claimed in claim 28, wherein the first velocity is at least 1.2 times the second velocity.

30. The method as claimed in claim 28, wherein the ratio of the first velocity to the second velocity is approximately 1.43:1.

31. The method as claimed in claim 28, wherein the first velocity is less than four times the second velocity.

32. The method as claimed in claim 28, wherein the ratio of the first velocity to the second velocity is approximately 3.2:1.

33. The method as claimed in claim 20, further comprising decelerating the sheet by operating the conveyor belt in a direction opposite that of the upstream sheet feeding equipment.

34. A starwheel feed apparatus for feeding sheets of web material into a starwheel, the starwheel having slots and being rotatable to receive the sheets in a first position and discharge the sheets in a second position, the slots positioned to receive and carry the sheets as the starwheel rotates, each sheet having a leading edge and a trailing edge; the starwheel feed apparatus comprising:

a feeding conveyor located upstream of the starwheel and movable to convey sheets toward the starwheel;

a guiding conveyor located adjacent the starwheel, the guiding conveyor having a conveying surface movable to convey sheets;

the conveying surface having a length and oriented to contact and guide the trailing edges of the sheets along the length of the conveying surface as the sheets enter the slots.

35. The apparatus as claimed in claim 34, wherein the feeding conveyor travels at a first velocity and the guiding conveyor travels at a second velocity.

36. The apparatus as claimed in claim 35, wherein the ratio of the first velocity to the second velocity is between 1:1 and 4:1.

37. The apparatus as claimed in claim 35, wherein the ratio of the first velocity to the second velocity is between 1:1 and 3:1.

38. The apparatus as claimed in claim 35, wherein the ratio of the first velocity to the second velocity is approximately 1.75:1.

39. The apparatus as claimed in claim 35, wherein the ratio of the first velocity to the second velocity is approximately 2.27:1.

40. The apparatus as claimed in claim 34, wherein the starwheel is one of a plurality of starwheels, and wherein at least one of the feeding conveyor and the guiding conveyor are located at least partially between starwheels.

41. The apparatus as claimed in claim 34, wherein the feeding conveyor is one of a set of feeding conveyors between which the sheet is moved toward the starwheel.

42. The apparatus as claimed in claim 34, wherein the guiding conveyor is one of a plurality of guiding conveyors.

43. The apparatus as claimed in claim 42, wherein the plurality of guiding conveyors is arranged end-to-end.

44. The apparatus as claimed in claim 43, wherein the conveying surface is defined by the plurality of guiding conveyors arranged end-to-end, and is concave with respect to the starwheel.

45. The apparatus as claimed in claim 42, wherein the plurality of guiding conveyors is arranged side-by-side.

46. The apparatus as claimed in claim 34, wherein the guiding conveyor travels at a first velocity and a tangential velocity of the starwheel is a second velocity different than the first velocity.

47. The apparatus as claimed in claim 46, wherein the first velocity is greater than the second velocity.

48. The apparatus as claimed in claim 46, wherein the first velocity is at least 1.2 times the second velocity.

49. The apparatus as claimed in claim 46, wherein the ratio of the first velocity to the second velocity is approximately 1.43:1.

50. The apparatus as claimed in claim 46, wherein the first velocity is greater than the second velocity and is less than four times the second velocity.

51. The apparatus as claimed in claim 46, wherein the ratio of the first velocity to the second velocity is approximately 3.2:1.

52. The apparatus as claimed in claim 34, wherein the guiding conveyor is a conveyor belt.

53. The apparatus as claimed in claim 34, wherein the conveying surface is concave with respect to the starwheel.

54. The apparatus as claimed in claim 34, wherein the conveying surface is substantially tangential to the starwheel.

55. The apparatus as claimed in claim 34, wherein the guiding conveyor is drivably connected to the feeding conveyor.

56. The apparatus as claimed in claim 34, wherein the guiding conveyor is drivably connected to the feeding conveyor through a speed reduction.

57. The apparatus as claimed in claim 34, further comprising a barrier positioned to contact the sheet and cause the sheet to be discharged from the starwheel.

58. A method of guiding a sheet of web material into a starwheel, the sheet having a leading edge and a trailing edge; the method comprising:

transferring the sheet from a feeding conveyor to the starwheel, the feeding conveyor having a first velocity;

feeding the sheet into a slot in the starwheel with the feeding conveyor;

moving the sheet in the slot toward an inserted position;

contacting the sheet with a conveying surface downstream of the feeding conveyor as the sheet moves in the slot;

rotating the starwheel; and guiding the trailing edge of the sheet along a length of the conveying surface as the sheet enters the slot.

59. The method as claimed in claim 58, further comprising conveying the sheet with the conveying surface at a second velocity, and wherein the ratio of the first velocity to the second velocity is between 1:1 and 4:1.

60. The method as claimed in claim 58, further comprising conveying the sheet with the conveying surface at a second velocity, and wherein the ratio of the first velocity to the second velocity is between 1.5:1 and 2.5:1.

61. The method as claimed in claim 58, further comprising conveying the sheet with the conveying surface at a second velocity, and wherein the ratio of the first velocity to the second velocity is approximately 1.75:1.

62. The method as claimed in claim 58, further comprising conveying the sheet with the conveying surface at a second velocity, and wherein the ratio of the first velocity to the second velocity is approximately 2.27:1.

63. The method as claimed in claim 58, further comprising conveying the sheet with the conveying surface at a second velocity, and wherein rotating the starwheel includes moving the sheet in the starwheel at a third velocity measured as a tangential speed of the starwheel.

64. The method as claimed in claim 63, wherein the second velocity is greater than the third velocity.

65. The method as claimed in claim 63, wherein the second velocity is at least 1.2 times the third velocity.

66. The method as claimed in claim 63, wherein the ratio of the second velocity to the third velocity is approximately 1.43:1.

67. The method as claimed in claim 63, wherein the second velocity is greater than the third velocity and is less than four times the third velocity.

68. The method as claimed in claim 63, wherein the ratio of the second velocity to the third velocity is approximately 3.2:1.

69. The method as claimed in claim 58, wherein contacting the sheet includes contacting the sheet with a conveying surface of a conveyor belt.

70. The method as claimed in claim 58, wherein guiding the trailing edge of the sheet includes guiding the trailing edge of the sheet along a length of a plurality of conveying surfaces.

* * * * *